United States Patent [19]
Mackelvie

[11] Patent Number: 5,736,059
[45] Date of Patent: Apr. 7, 1998

[54] WASTE WATER HEAT RECOVERY SYSTEM

[76] Inventor: Winston R. Mackelvie, P.O. Box 1156, Knowlton, Quebec, Canada, JOE IVO

[21] Appl. No.: 533,683

[22] Filed: Sep. 26, 1995

Related U.S. Application Data

[63] Continuation-in-part of Ser. No. 27,290, Mar. 5, 1993, abandoned.

[51] Int. Cl.⁶ .................................................. C02F 1/02
[52] U.S. Cl. .................. 210/774; 210/86; 210/179; 210/181; 210/187; 165/47
[58] Field of Search .................... 210/175, 176, 210/179, 181, 183, 187, 86, 774, 170; 165/47

[56] References Cited

U.S. PATENT DOCUMENTS

| | | | |
|---|---|---|---|
| 3,511,378 | 5/1970 | Goregliad | 210/181 |
| 4,048,063 | 9/1977 | Cheng | 210/187 |
| 4,066,550 | 1/1978 | Beaumont | 210/183 |
| 4,238,337 | 12/1980 | Peters et al. | 210/179 |

*Primary Examiner*—Thomas G. Wyse
*Attorney, Agent, or Firm*—Eric Fincham

[57] ABSTRACT

The present invention is an apparatus and system to recover heat from wastewater in a new or existing building comprising a convector heat exchanger with thermal storage that accepts wastewater of any temperature, an in-line separator to direct large solids away from the heat exchanger, a process to create turbulent flow in the tubing from which the heat exchanger is made, an automatically switched vibration base to improve heat transfer, an automatic flush system for the wastewater heat exchanger and a method of installation in slab-built buildings.

20 Claims, 15 Drawing Sheets

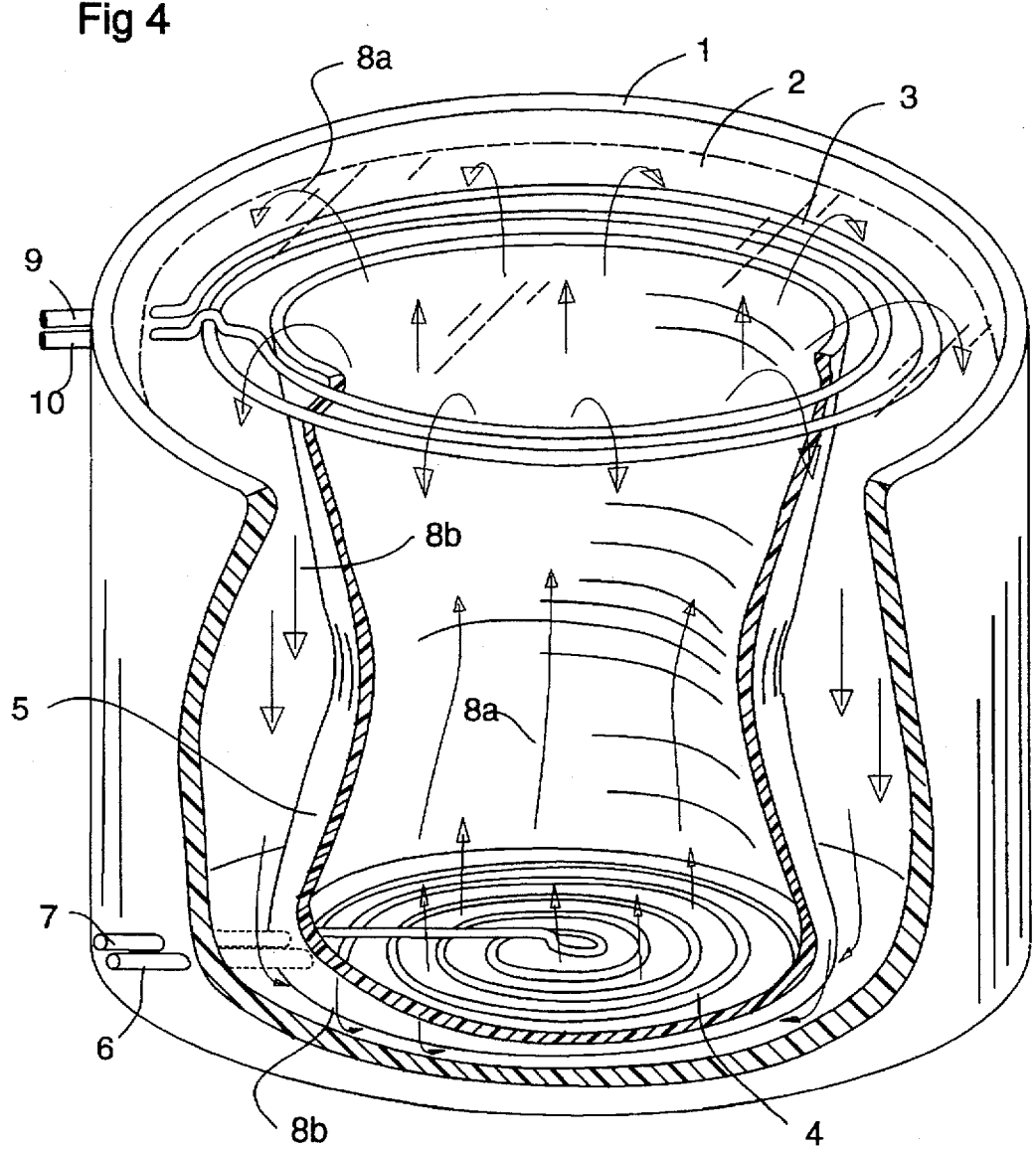

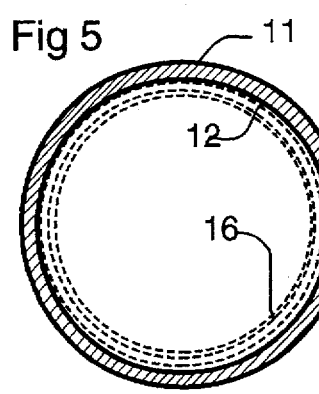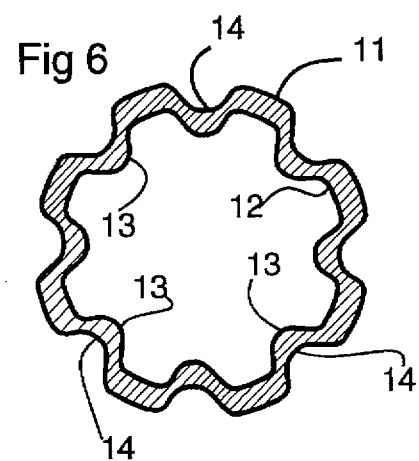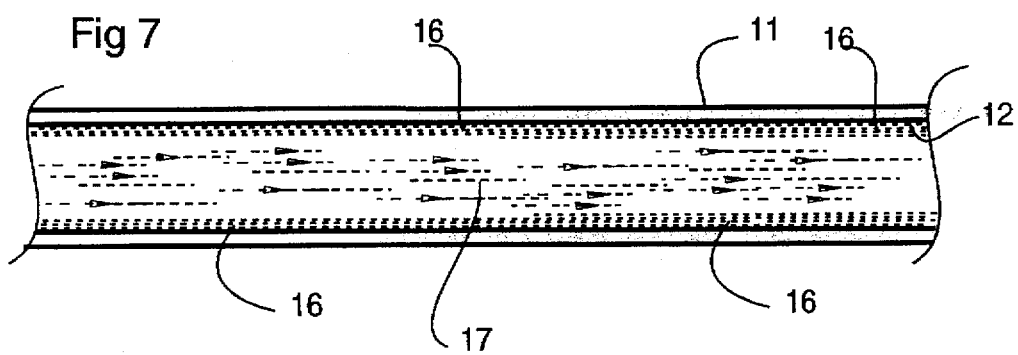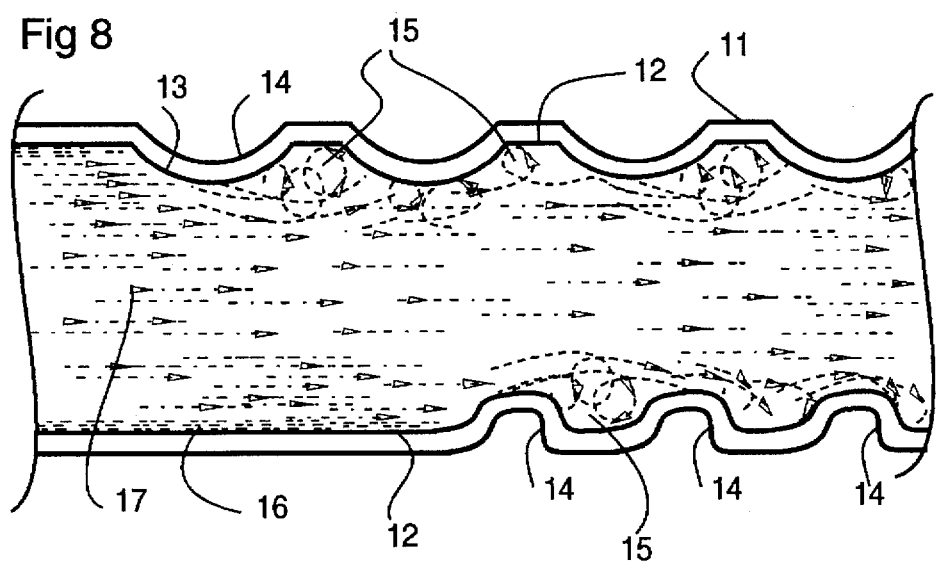

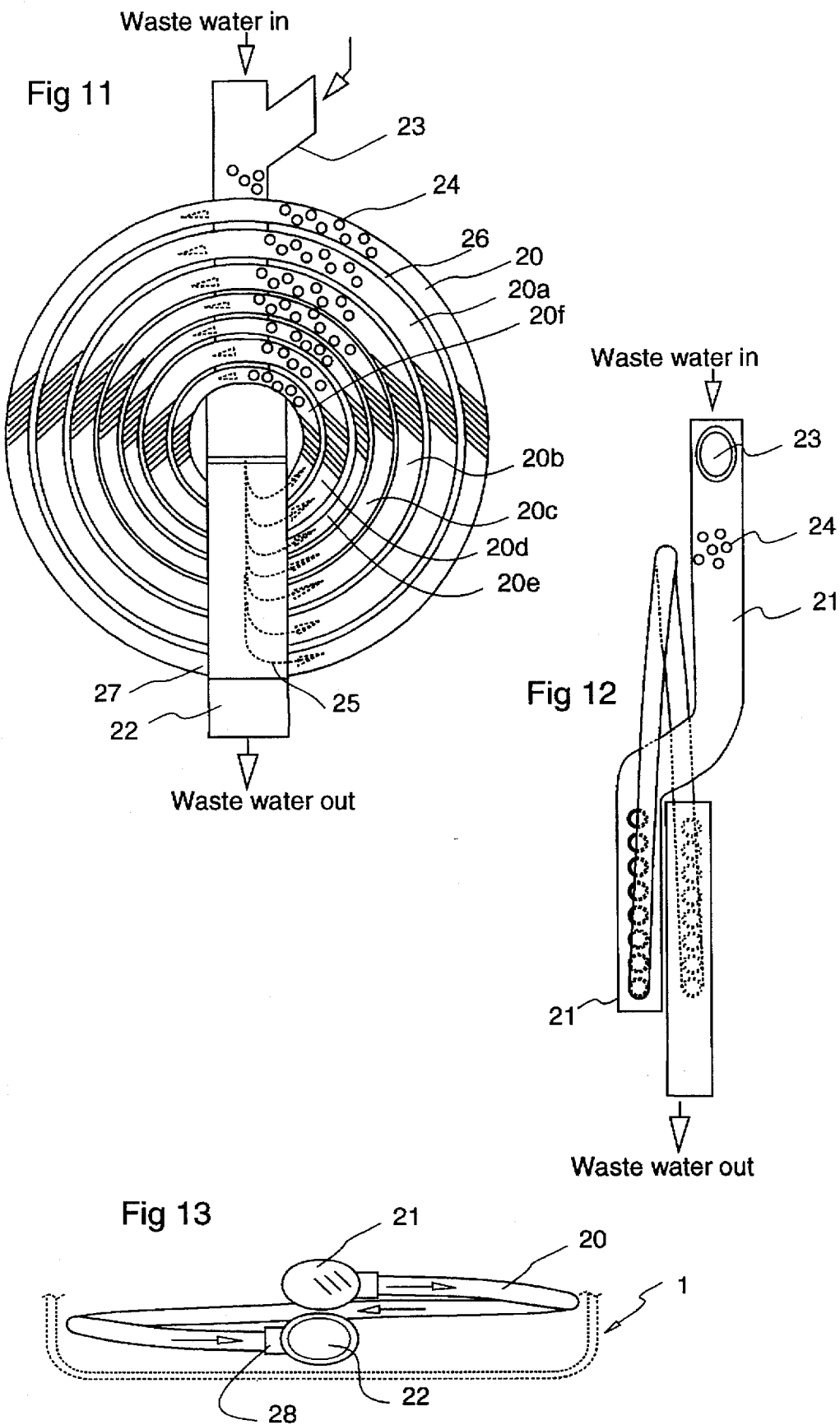

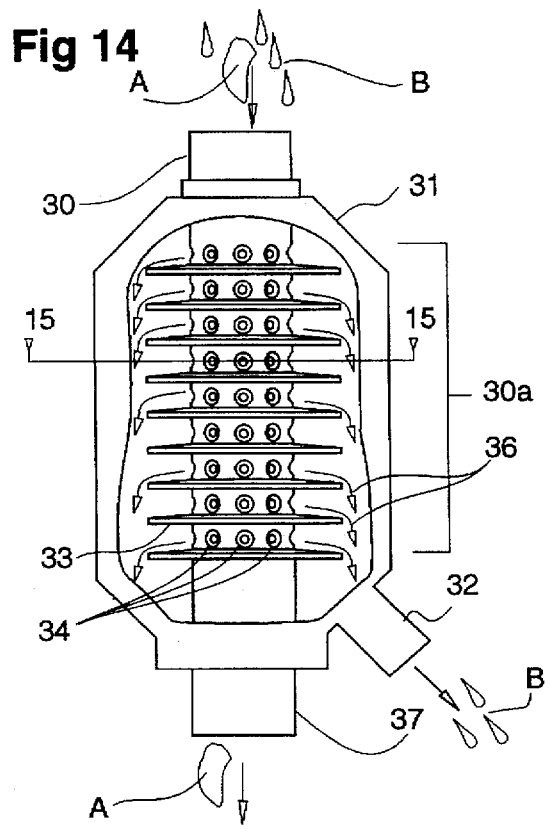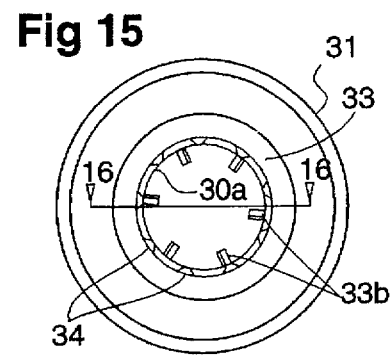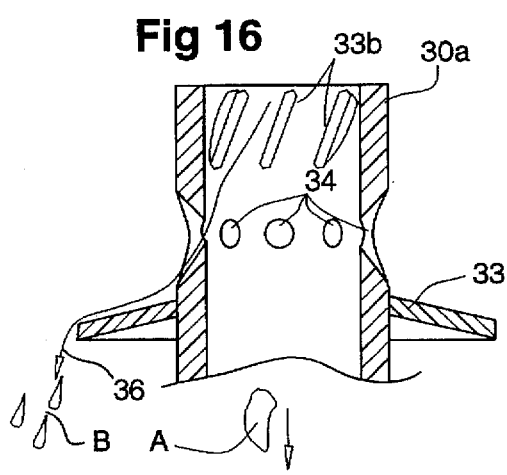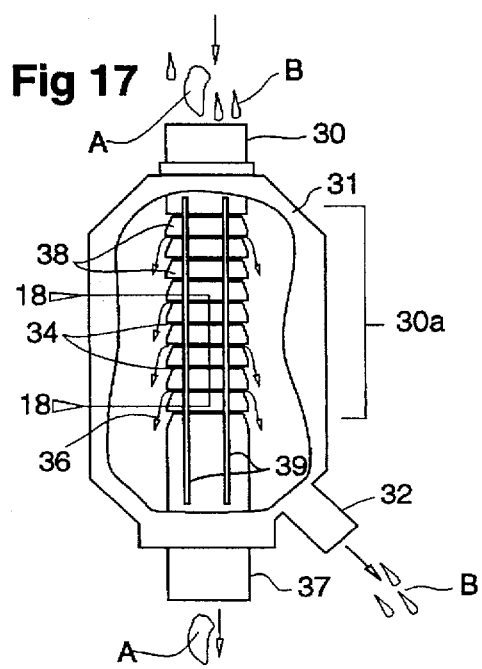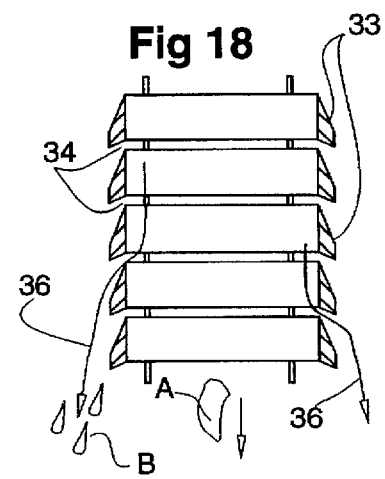

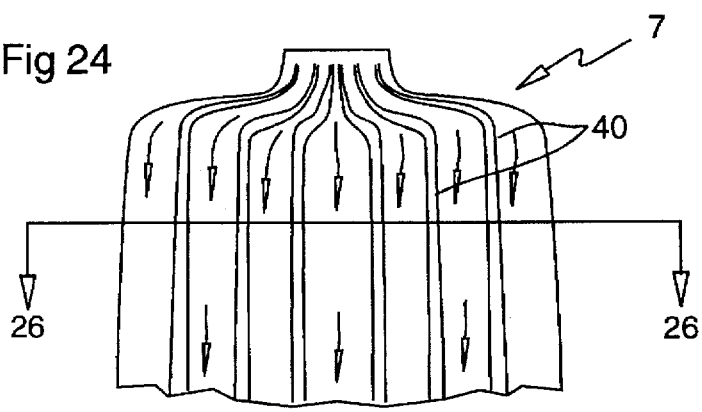
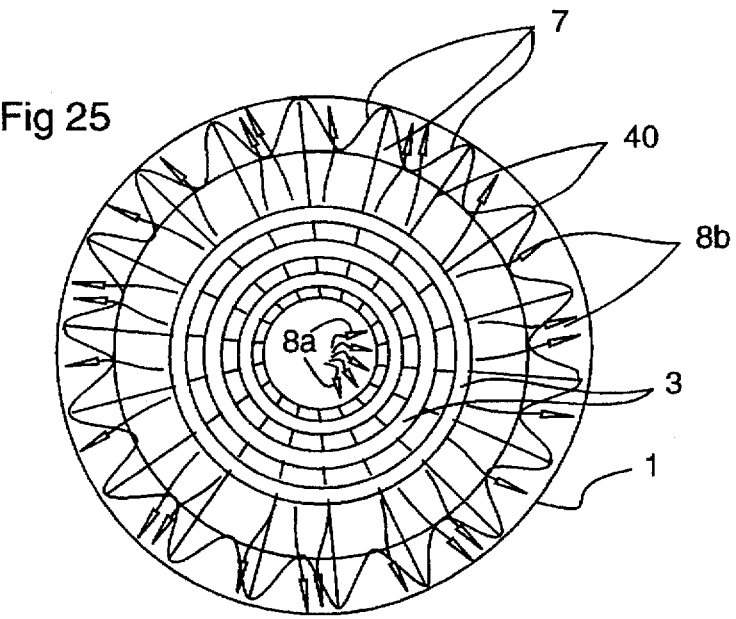
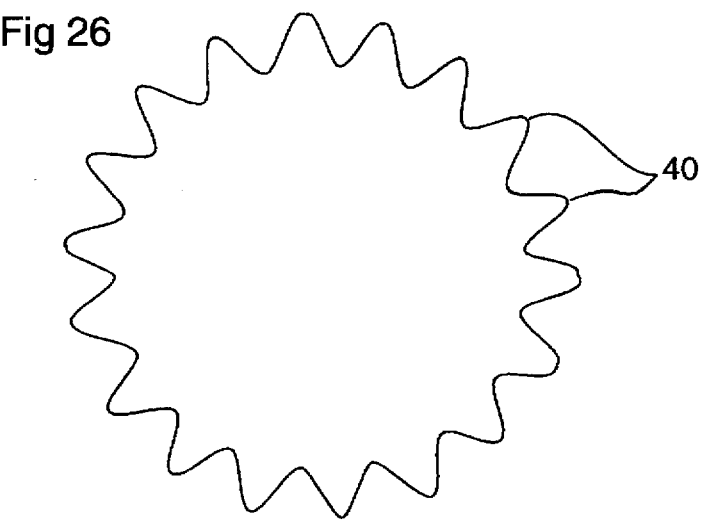

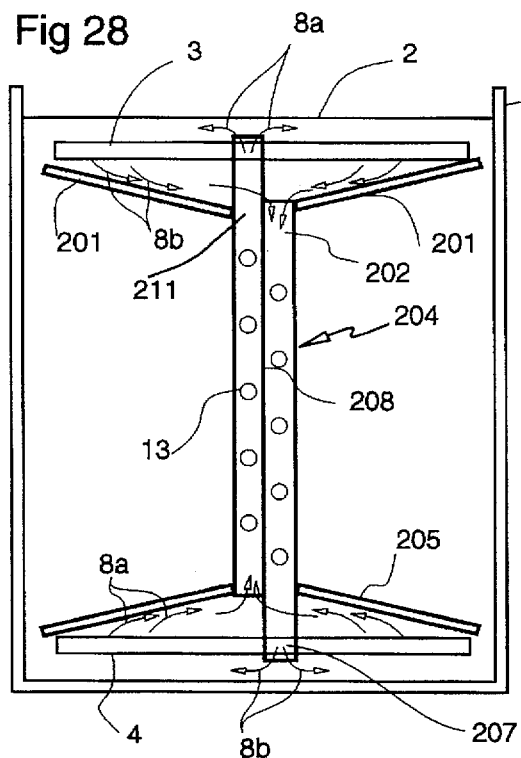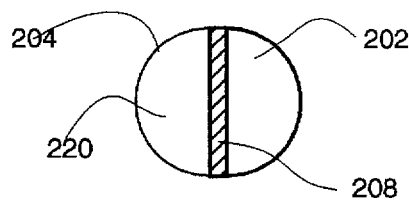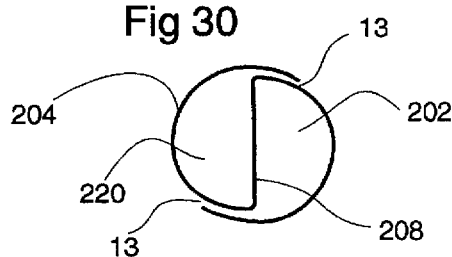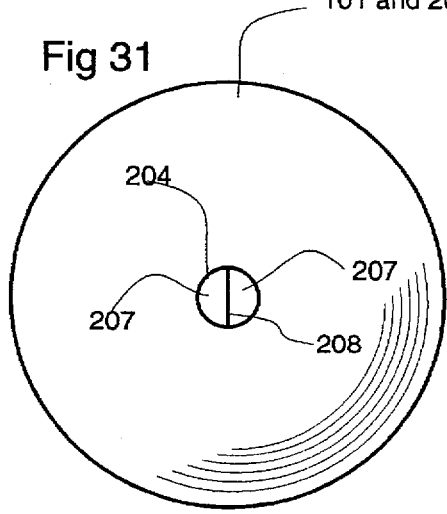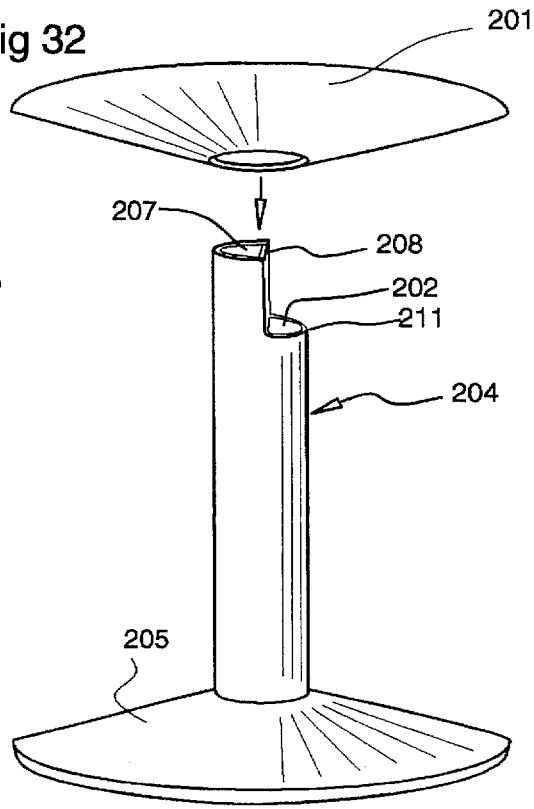

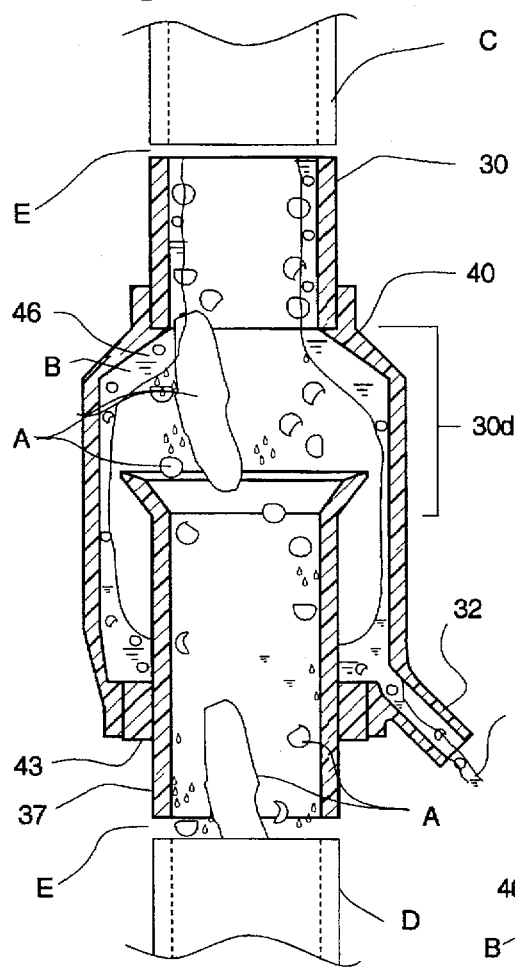
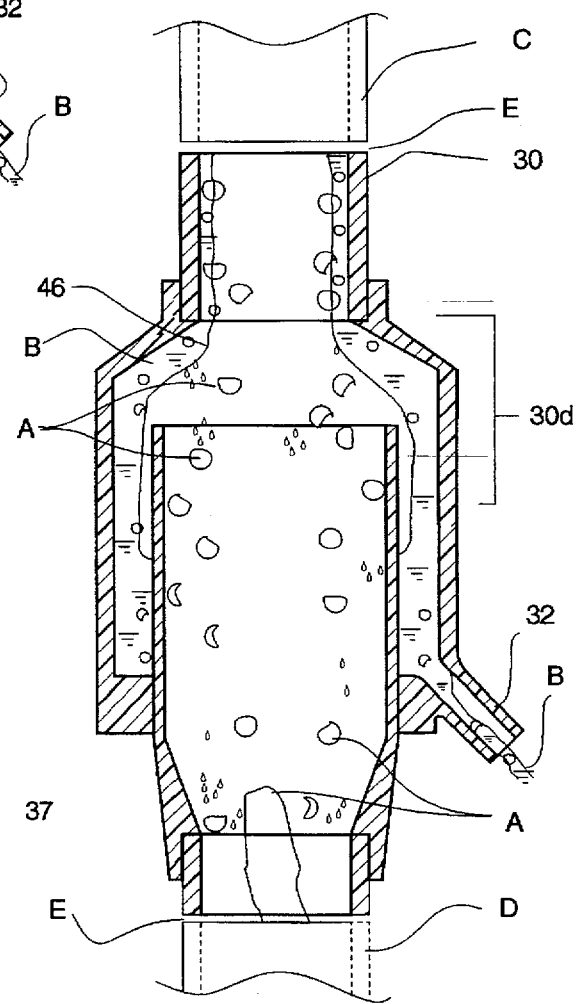

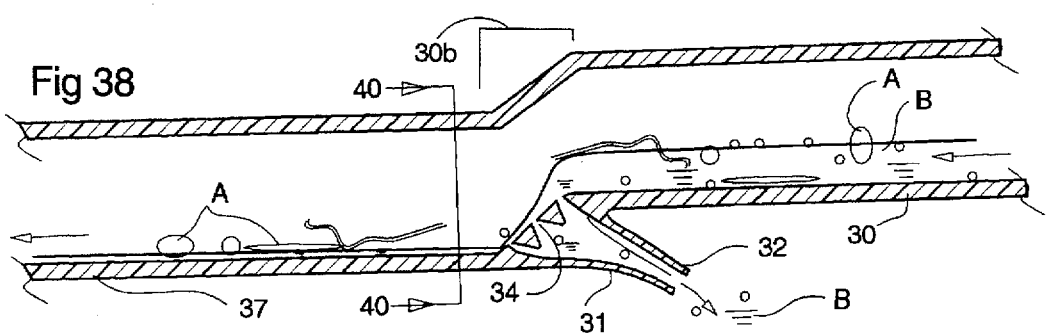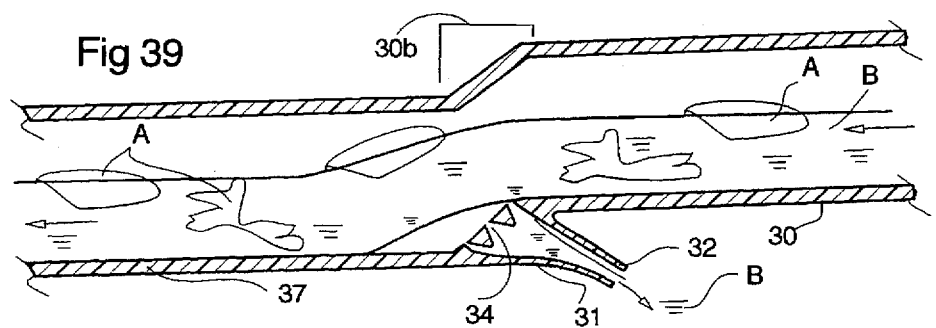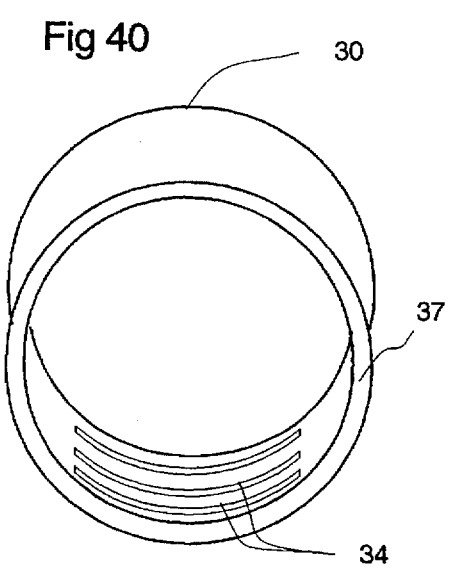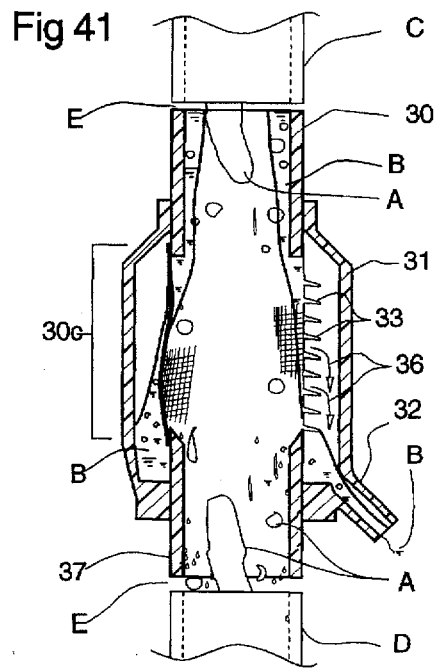

WASTE WATER HEAT RECOVERY SYSTEM

The present application is a continuation-in-part of application Ser. No. 08/027,290 filed Mar. 5, 1993, now abandoned.

FIELD OF THE INVENTION

The present invention pertains to the recovery of heat from a building's wastewater to reduce energy use and cost and to reduce the pollution created from energy waste.

BACKGROUND OF THE INVENTION

Buildings wherein there is human activity almost universally have heated water to supply fixtures and appliances such as showers and machines for washing; and a cold water supply for rinsing and drinking. The wastewater thereby produced flows to a common drain to the sewer system and is indeterminate as to temperature and composition at any given moment. Further the flow rate varies through a 24 hour period.

Piped cold water under pressure is delivered to a building at ground temperature. A branch supplies the water heating apparatus, most usually a hot water tank that uses electrical energy, or a fossil fuel (oil, gas), to heat and store the water at a temperature of about 140° F. (~60° C.).

Flow of hot water throughout a building is caused by the temporarily release of pressure by an opened faucet or a filling appliance, whereafter the cold water supply under pressure, displaces the stored heated water from the tank whose thermostat then switches on the heater means. Water has the highest specific heat of all matter and heating it requires the most energy. Wastewater flowing from the building still contains most of that energy.

Wastewater draining to the sewer carries with it some 20–30% of the total energy generated in a country. The money paid-out for that energy is largely wasted and can account for half the operating cost in some buildings. Furthermore an enormous amount of pollution is produced from coal burning power stations that generate electrical energy needed to heat water. Millions of tons of exhaust are released into the atmosphere, including: carbon dioxide, a global warming gas; nitrous and sulfurous oxides which produce smog and acid rain; toxic ash; and scrubber effluent. If the electricity is generated by nuclear facilities then some 20–30% of the residue radioactive fuel rods represent the hot water component of the total. In hydro generation, 20–30% of the environmental damage and costs is from hot water use.

Moreover, during each 24 hour day, the profile of hot water use matches closely the profile of 'peak-power' demand from a power utility. Thus the total power required to heat water at same times-of-day creates the peak-power demand adding greatly to the cost, complexity, pollution, danger, size and number, of power stations. With ground temperatures dropping in winter, the added energy needed to heat colder water adds to the known increase in power demand during winter in many countries.

SUMMARY OF THE INVENTION

It is an object of the present invention to provide a system for recovering heat energy from draining wastewater.

It is a further object of the present invention to provide a heat exchanger system adapted to recover heat from waste water for the purposes of heating incoming cold water.

It is a further object of the present invention to provide a system for separating liquid from a liquid containing composition such as encountered in wastewater.

It is a still further objection of the present invention to provide a method of recovering heat from wastewater in a plumbing system for a building.

According to one aspect of the present invention, in a plumbing system for a building and which includes a cold water supply and a water disposal conduit, there is provided the improvement which comprises an apparatus to transfer heat from waste water in the water disposal conduit to the cold water, the apparatus comprising a reservoir, a heat transfer fluid substantially filling the reservoir, a first heat exchange means disposed bottomwards in the reservoir, the first heat exchange means having an inlet and an outlet, the inlet and the outlet of the first heat exchange means being operatively connected to the waste water disposal conduit such that water passing through the waste water disposal conduit will pass through the first heat exchange means, a second heat exchange means disposed topwards in the reservoir and spaced from the first heat exchange means, the second heat exchange means being immersed in the heat transfer fluid, the second heat exchange means having an inlet and an outlet operatively connected to the cold water supply such that cold water entering the system passes through the second heat exchange means, the arrangement being such that heat is transferred from the first heat exchange means to the second heat exchange means by means of the heat transfer fluid.

In a further aspect of the invention, there is provided a method of recovering heat from waste water in a plumbing system in a building, the method comprising the steps of supplying a heat exchange apparatus comprising a reservoir, a heat transfer fluid substantially filling the reservoir, a first heat exchange means disposed bottomwards in the reservoir and spaced from the bottom thereof, a second heat exchange means disposed topwards in the reservoir and spaced from the first heat exchange means, the second heat exchange means being immersed in the heat transfer fluid, causing waste water from the plumbing system to pass through the heat exchange means prior to a exiting to a drain, and directing cold water through the second heat exchange means whereby heat is transferred from the first heat exchange to the second heat exchange means by means of the heat transfer fluid.

In a further aspect, there is provided a system for separating liquid, from a liquid containing composition, the system comprising a first conduit section, the first conduit section comprising a wall having an exterior surface and an interior surface, and at least one aperture formed in the wall, the aperture having an outwardly tapered configuration from the interior surface to the exterior surface such that the aperture area on the interior surface of the wall is smaller than the aperture area on the exterior surface of the wall.

In a still further aspect, there is provided a system for separating liquid from a liquid containing composition flowing in a substantially vertically oriented conduit, the system comprising a first conduit section having a first diameter, a second conduit section connected to and downstream of the first conduit section, the second conduit section having a diameter larger than the diameter of the first conduit section, and a third conduit section connected to the second conduit section, the third conduit section having a portion thereof extending interiorly of the second conduit section, the third conduit section having a diameter at least substantially as large as the diameter of the first conduit section, the third conduit section having an open end at the portion interior of the second conduit section such that solid material flowing in the direction of fluid flow from the first conduit section will enter said third conduit section, and liquid outlet means in the second conduit section.

Still further, there is provided a method for separating liquid from waster water in a building, the method comprising the steps of inserting a conduit section in a drain pipe, the conduit section having a wall defining the interior conduit, the wall having a plurality of apertures formed therein, the apertures being formed to have an outwardly tapered configuration from an interior surface of the wall to an exterior surface thereof, and directing the waste water through the conduit such that the liquid will flow adjacent the wall to separate liquid from waste water, and separately collecting the liquid.

The wastewater heat recovery apparatus is a three fluid convector heat exchanger that in it's simplest embodiment, comprises a non-pressurized plastic tank or reservoir covered, insulated and filled with one fluid, and with two separate and spaced-apart heat exchangers placed therein.

Located near the bottom of the tank, is the first heat exchanger connected to the first fluid which is a wastewater supply from which heat is to be recovered. This bottom location defines a 'first heat transfer zone' substantially filled by the first heat exchanger, but with sufficient space for convective fluid flow about it. This first zone terminates at the uppermost surface of this first heat exchanger.

Located near the top of the tank is the second heat exchanger connected to a second fluid which is a cold fluid supply to be heated. This top position defines a 'second heat transfer zone' which terminates below it's lower surface.

The fluid filling the tank can be clean water to provide both convective heat transfer between the two heat transfer zones, and, thermal storage for heat recovered by the first heat transfer zone from the wastewater. This clean water at least touches the upper (second) heat exchanger and preferably submerges same.

There is no intermixing of the three fluids.

From elementary knowledge, stationary, undisturbed water exhibits stratification whereby it naturally arranges itself into any number of layers or strata according only to the temperature of each layer/colder layers below and hotter layers above. This stratification occurs because the density, or weight, of cooled water is greater than warmed water and so, as demanded by gravity, cooled water will always sink below any warmer water and float above any colder water creating its own respective layer whose vertical location in a tank is only and solely dictated by its relative temperature. Such a thermal layer will remain in its temperature related vertical layer until local heating and/or cooling occurs. Then, all layers will automatically rearrange themselves according to resulting temperature changes. A heated layer or strata becomes less dense and is thus must rise above all cooler layers.

Any heat exchange that may occur into—or from—the tank water in the above defined heat transfer zones, changes the temperature(s) of that respective layer, namely in the top and/or bottom layers. The heated or cooled tank water in those zones must then automatically move to new positions.

Any heat absorbed into the coldest lower tank layer from wastewater flowing through the lower heat exchanger, automatically changes the density of the bottom layer which then floats upwards. Colder fluid flowing through the upper heat exchanger automatically absorbs heat and thereby increases density of that upper tank layer which then sinks downwards. Between the heat exchange zones, the body of tank water has thermal storage capacity, becoming mostly cold after hot water demand at a fixture sends large amounts of cold water through the upper heat exchanger, or hotter after the draining of a large body of hot wastewater through the lower heat exchanger.

The present wastewater heat recovery apparatus is a convector heat exchanger with thermal storage that reduces the temperature of wastewater leaving a building. The recovered heat is deposited into the tank water and automatically transfers to a colder fluid flowing through the upper heat exchanger. If this colder fluid is water feeding a hot water tank, then the total new energy required to heat that now pre-heated cold water to a set storage temperature, is reduced. As well, the time to reach storage temperature is reduced as is peak-power demand, energy cost and pollution created.

Safety from contamination of the fresh water by the possibly septic wastewater is mandatory for such an apparatus, especially if single walled tubing is used in the construction of the heat exchangers. Safety is assured by the unique placement of the heat exchangers and by the use of the intermediary of clean tank water to transfer heat. Contamination of the fresh water supply can occur only if a leak in the lower exchanger occurs allowing possibly septic wastewater to seep into the tank fluid (water) contaminating it and thereby jeopardizing the fresh water supply carried in single walled tubing, which is submerged in the same tank fluid. But since wastewater flow is intermittent, the internal pressure in the wastewater heat exchanger is zero from time to time. The tank water pressure at the tank bottom, is always greater than zero. The tank must therefore drain away into the lower heat exchanger and thence to the sewer when there is no wastewater flow, leaving the upper heat exchanger high and dry protecting the fresh water supply from contamination.

Further, any such leakage and any resulting change in volume can be easily detectable with a level indicator means, which could then provide a signal source to actuate a valve to re-direct the fresh water supply, by-passing the wastewater heat recovery apparatus until repairs are made. Moreover, the fresh water is almost always under full pressure and the tank water at the top just submerges the heat exchanger and therefore has virtually no pressure with which to force entry into the pressurized water stream. However, a pressure failure to the fresh water supply, however unlikely, combined with simultaneous upper and lower heat exchanger leaks, would still make possible contamination unacceptable. Means to detect such a pressure failure or drop in the normally constant pressure water system would provide a signal source to actuate a fail-safe valve and thereby by-pass the wastewater heat recovery apparatus. The fresh water flow through the wastewater heat recovery apparatus would be re-established only after inspection and/or repair. By these means, the fundamental requirement of absolute safety is provided for in this present invention.

The passage of cold wastewater through such an heat recovery apparatus must not remove previously recovered heat, otherwise the hot and cold wastewater streams would have to be separated in the building with each having it's own drain system. This would greatly inhibit the use of wastewater heat recovery since the building would have to be re-plumbed. To reduce recovered heat loss to cold wastewater, the lower heat exchanger is made planar in section to occupy as little vertical volume of the tank as possible, in that way, should cold wastewater flow, only that lowest layer of tank water will be cooled producing only downwards convection. Recovered heat floating above the lower heat exchanger in thermal layers, will be unaffected. Details of planar heat exchangers follows later in these specifications.

The three conditions of operation of the wastewater heat recovery apparatus follow.

When both fresh water and wastewater be flowing through the wastewater heat recovery apparatus (i.e., someone taking a shower) a toroidal convective flow in the tank water takes place between the lower to the upper heat exchanger, continually transferring heat from below to above.

Should only wastewater be flowing (appliance draining) through the wastewater heat recovery apparatus, the coldest possible tank water at the bottom will absorb heat energy and rise to upper layers where it will remain in temporary storage.

Should only cold, fresh water be flowing through the wastewater heat recovery apparatus and thence into the water heater (appliance filling), the hottest possible tank water at the top will preheat it and then sink forming a layer below ready to receive heat again. The heretofore intractable problem of dealing with heat loss to cold wastewater is solved by a surprising simple arrangement of a lower planar heat exchanger element in combination an upper heat exchanger and the water separating them.

To increase overall efficiency, the sinking convection currents can be kept separate from those that are ascending, by ducts collecting connection currents rising from the lower heat exchanger and ducting them towards the open center of the upper heat exchanger. Details of such funnelling ducts are included later in these specifications.

Considerations in designing the highest efficiency wastewater heat recovery apparatus at the lowest cost include the basic dimensions of the reservoir or tank. Larger tank volumes can have larger heat exchangers for higher heat transfer rates and also have greater thermal storage capacity. A larger diameter tank will provide a larger cross-sectional area for the planar heat exchanger. This will, in turn, increase the rate of heat transfer and efficiency. But the larger interface areas formed between thermally stratified layers in a larger diameter tank encourage more conductive heat transfer between the strata thereby minimizing the temperature differential more quickly between the top and the bottom heat transfer zones. Although the total stored energy remains unchanged, the rate of heat transfer from temperature difference is greatly reduced.

A practical consideration is that many buildings have limited size access by way of door or stairway dimensions which limits possible configurations. Thus a residential model of the wastewater heat recovery apparatus would approximate the size and shape of a standard hot water tank.

In all cases the wastewater heat exchanger should be placed as low as possible allowing sufficient space between it and the tank bottom and tank walls for unrestricted convective flow. Another important consideration for the wastewater heat exchanger is the spacing between the rings of tubing which permits unrestricted convective flow therebetween. The closer the rings are to each other, the more tubing can fit into the heat transfer zone and therefore the more surface area can be installed in a given diameter tank with resulting maximum rates of heat transfer and efficiency.

The precise size and arrangement of the tank and the heat exchangers will depend upon the maximum flow rate and drainage time allowed for passage through the wastewater heat recovery apparatus. There are also four extraneous economic pressures. One, is the efficiency whereby doubling the surface area of the heat exchangers by doubling the linear footage of tubing will almost double the heat transfer and energy saved. But doing so will, two, substantially increase the cost and therefore the payback time for the purchaser. However the lifetime savings, three, will be greatly increased, in fact almost doubled. Therefore the desired pay back interval, four, is the criterion for surface area of the heat exchangers which then determines the physical dimensions of the reservoir within the above mentioned size limitation of access.

Generally, the heat exchange zones may occupy 5%–20% of the total volume of the reservoir, depending on pay back goals, with a preferred range being between 5%–10%. The wastewater heat transfer zone may be 50%–80% filled with the heat exchange tubing, with the higher value being preferred as it increases the proportion of heat transfer surface area to the total zone volume, which should include enough tank liquid filling the flow spaces in and about the tubing, for maximum heat transfer. Oval tubing and/or finned tubing can also increase surface area and heat transfer.

Using two units in series or in parallel will obviously increase benefits while allowing them to be carried into a building.

Fouling is another problem that is addressed in this present invention. Fouling is the gradual blocking of a tube from particulate matter in the wastewater stream clinging to—and continually building up on—the wall of the tube from which the heat exchanger is made. Fouling occurs in the virtually stationary boundary layer of wastewater, next to the smooth tube wall, whose indeterminate particulate matter may precipitate or 'stick' to the tube wall. Fouling is aggravated by laminar, or low velocity fluid flow. Fouling directly reduces the heat transfer efficiency of a heat exchanger and also reduces the rate of fluid flow possible therethrough.

Turbulent flow through a tube, greatly reduces or eliminates the boundary layer and therefore the fouling. Changing the laminar flow of a wastewater stream into turbulent flow, would reduce or eliminate fouling in the lower wastewater heat recovery apparatus' heat exchanger. In order to accomplish this conversion of laminar flow to turbulent flow there may be provided a high speed punch means to impact a tube's exterior wall to produce/a plurality of closely-spaced, highly localized dimples which transfer through the tube wall thereby creating smooth protuberances in the form of a pebbled finish on the tube's interior wall/hereinafter referred to as 'enhanced tubing'. Enhanced tubing can be produced inexpensively. Impacting 'as supplied' pre-coiled tube with dimples using the tool herein described allows the use of much longer lengths of continuous, safer, no-joint, tubing than can be had with the limited lengths straight tubing required for dimpling processes disclosed in the prior art.

Enhanced tubing changes laminar flow into turbulent flow by forcing the fluid to constantly move about, around and over the pebble finish. This is the random pressure and velocity variations that define turbulent flow/vortexes of turbulence. Turbulent flow destroys the boundary and laminar layers and hence, the associated fouling. The faster the flow the greater the turbulence. Fast flow from a washing machine, will remove fouling that may have developed from slower flow such as at the trickle at the end of a shower.

Enhanced tubing also improves heat transfer by constantly mixing the hotter fluid flowing through the center of the tube with the over-cooled slow-flow at the wall, improving wastewater heat recovery performance and cost effectiveness.

As aforementioned there is additionally provided an internal funnel duct structure for maximizing the temperature differential between the tank water and the heat exchangers. This enhances heat recovery and transfer.

A ducts structure provides means of separating the rising—and the sinking—convection currents from each other, and, from the main body of stationary tank water. This optimizes the temperature differential in the upper and lower heat exchange zones by maintaining convection temperature. Since the rate of heat transfer increases directly as temperature differential across the heat exchanger, ducting the rising heated convection currents to provide the shortest and quickest route to the proper strata, top and bottom, maintains the highest temperature at the top heat transfer zones.

The ducts can be made of some insulating material such as foamed polyethylene to reduce conductive heat transfer between the convection currents and the surrounding thermal layers they must move through. Additionally, a mirrored surface thereon would similarly reduce radiation heat transfer.

A slit or a series of perforations in these ducts allows these currents to move out of the duct should their temperature require an intermediary layer position. A further improvement to the ducts is the use of fluting or fins or deep grooves in the duct construction to direct and straighten flow thereby preventing meandering of the convection currents further assisting the temperature differential at the top and the bottom of the tank.

In one duct embodiment, two funnel shapes with centered holes, one above the lower heat exchanger pointing upwards, and a second below the upper heat exchanger pointing downwards, extend diametrically beyond the extreme outer ring of their respective heat exchanger element. Convection currents generated by the heat exchangers thus collect at the centered hole.

A vertical connecting duct seals to each respective funnel hole. The ends of this tubular duct extend past the funnel hole. The funnels and ducts should be made of a material such as foamed polyethylene, to provide prevent unwanted heat loss or gain between the surrounding water and the convecting liquid within the duct.

A vertical center separator divides the connecting duct creating a two-way duct/one side for upwards convection and the other for downwards convection. The portions of the two-way duct that extend beyond the funnel holes are modified by removing one half of the duct wall between the funnel hole and the end, while retaining the full length of the center separator. This is done on opposite sides of the vertical center separator, at the top and the bottom, creating separate openings into the two-way duct for the appropriate convection currents to enter while still directing the opposite moving currents without interference.

The convection currents are thus collected into the smallest volume of fluid and so will remain closer to the original temperature when they left the heat exchanger. This means the convection currents will reach their respective higher or lower destinations at the best temperature for heat transfer performance. In turn, heat recovery from wastewater is made more economically feasible due to a faster pay-back.

The duct should have vents along the length to allow convecting water to escape if blocked by a previously created strata and temperature of water through which subsequent convection currents would not be able to pass due to their temperature. This would cause a back-up in the draft tube leading to poor temperature differential across heat exchangers.

Additionally, the hot duct could have a lengthwise spiral insert to separate (by the centrifugal force thereby generated) the cooler currents to the outside of the duct allowing the hotter currents to rise up the center and maintain their higher temperature.

The hot side of the above described ducts may be larger than the cool side since cool currents are necessarily more dense and therefore require less space.

Another improvement addresses the problem of retrofitting the wastewater heat recovery apparatus to existing buildings. It is clear that wastewater includes toilet waste which in all buildings is of the same size and constitutes the largest particulate that can be reasonably anticipated in a drainage system. Using large size tubing means a more expensive installation and less surface area and longer pay back. Therefore smaller diameter tubing for the wastewater heat exchanger should be used. Such a wastewater heat recovery apparatus can therefore only pass smaller particulates, not toilet solids, and so the following apparatus may be used.

It is well known that a liquid flowing in a vertical section of a drain pipe, which is a typical configuration, flows in a tubular sheet down the pipe walls, (hollow in the center) and will therefore freely pass through any holes made in the pipe wall.

The present non-blocking solids separator invention for the wastewater heat recovery apparatus comprises a first section of drain pipe with a plurality of tapered perforations circumferentially spaced and arranged in a series of parallel rings with plain spaces therebetween. The smaller end of the holes face the pipe interior. Washer-like sloping deflectors are fitted over this first section and attach to the plain spaces between the holes. A second pipe forming a jacket encloses both the first pipe and it's deflectors and is sealed to the top and bottom of said first inner section and is provided with a fitting at it's lower end to connect to a the wastewater heat recovery apparatus. By this structure only liquid wastewater and smaller particulate can flow into the wastewater heat recovery apparatus which can then use smaller diameter tubing.

When wastewater enters the drain pipe, almost all the liquid and small particulate pass through the perforations, flow over the deflectors into the jacket and down to the fitting for connection to the wastewater heat recovery apparatus. Using tapered holes allows particulates that pass through the hole at the small end and to freely continue through the ever increasing cross-section area of the tapered, enlarging hole, eliminating blockage that would occur in plain holes. The deflectors prevent liquid flowing out through holes in the upper portion from re-entering holes lower down.

In a second embodiment of the present invention, the separator is based on a free-fall gap instead of tapered apertures. The first conduit section expands angularly to the inner wall of a second conduit section which forms an enclosing jacket such that the wastewater will naturally flow outwardly by capillary action clinging to the angled path to the jacket wall and thence to a fitting for connection to the required wastewater appliance. However heavier solids and sludges lacking this surface tension, fall vertically from the wastewater and drop through the gap and enter the third conduit section which connects to the sewer. In this way the desired separation of the liquid from the wastewater occurs.

In a third embodiment the separator is for use in a horizontal drainpipe where the potential of blockage from toilet waste are more severe since the water rush accompanying a flushing toilet is essential to ensure adequate flow for the complete draining of these septic solids. This embodiment has a first conduit section with non-blocking apertures.

The apertures are located in a step-change in drainpipe cross-sectional area. The step can be vertical or at an angle and creates a waterfall in the wastewater flow. Toilet flow occurs at flow rates of gallons-per-second as compared to all other plumbing fixture which flow their waste in gallons-per-minute or less. This fast toilet flow has considerable momentum and flows in a trajectory over the step section largely avoiding the tapered apertures in the step section. This ensures full flow rate to prevent blocking in the drainpipe. At all other flow rates, the wastewater containing smaller particles flow down the step and through the non-blocking apertures into the sealed jacket and to a fitting for connection to an appliance. Solids and liquids that do not escape, continue flowing into the toilet flow landing region which carries them to the sewer.

In a fifth embodiment, a flexible fabric/mesh, such as nylon, is used to separate a vertical flow of wastewater. The flexible mesh forms the first conduit section and connects and seals to non-perforated entry and exit portions. As with the other embodiments, an enclosing jacket also seals to these non-mesh portions. This embodiment would depend on the flexing of the fabric/mesh from wastewater turbulence to dislodge blockages. The fabric/mesh may be shaped diamond-like to provide ideal capillary action for the separated wastewater to run through the fabric/mesh and not back in. Such shapes include a conical shape with the wide end facing upstream to encourage the separated wastewater flow to drip off the mesh into the jacket. Another form would include folding ring-like pleats in the fabric/mesh forming vertically spaced, integral deflectors.

In large buildings such as hotels where wastewater flow increases dramatically at certain times of day, multiple separators for parallel operation can be fitted about the drainpipe offering larger capacity as required. Additionally; such separators may be fitted in series at different vertically spaced intervals to drain off wastewater in stages of allowable solid size, larger solids being allowed to separate with liquid upstream and prevented with smaller apertures downstream. In buildings where each floor may have water heating equipment, a separator may be fitted to the drainpipe on each floor.

For collecting desirable food scraps, a smaller version of the present invention could be fitted upstream in the plumbing system where such waste is generated. For example, under the kitchen sink, a separator would allow food solids, rinsed to the drain, to be collected in a removable container. In this embodiment, the jacket is connected to the regular drain pipe which then can have a second separator downstream for separating the toilet wastes.

For separating toilet waste for treatment, a small separator of a kind described above could be incorporated into the toilet body design to cause liquids to drain separately from solids.

Wedge-shaped slots could be used where the upper outer surface of the wedged slot includes a deflector means. A spiral slot of wedge shaped cross-section could also be used with deflector means being a spiral flange facing the jacket to prevent wastewater from re-entering the spiral slot lower down.

Leaving the wastewater heat recovery apparatus, the now cooled wastewater re-enters the original drain pipe via a standard pipe fitting to recombine with the large solid that passed directly through the separator.

A suitable planar heat exchanger is next described. In it's simplest form, the wastewater heat exchanger can be a single length of tubing coiled into a flat spiral, a 'pancake' shape, with adequate flow clearances between the rings of the spiral and the tank. Since either the inlet or the outlet end of the spiral must traverse the spiral to reach the reservoir wall for connection to the fluid supply, the crossover section may be insulated if passing on top of the spiral thus minimizing heat loss to cold wastewater.

Wastewater flow varies widely in all buildings. In a hotel, rates of flow vary from zero gallon per minute, to full capacity which in turn directly depends on the number of guests, and, on the time of day. Early morning is the highest rate of flow and after midnight, the lowest rate, but a sudden and unanticipated flow change can develop any time.

It is known that the rate of heat transfer through a tube wall increases with: more surface area; higher temperature differential; and, with the thermal conductivity of the tube material, while the rate of heat transfer is reduced by increased rate of fluid flow. Optimizing these factors increases the wastewater heat recovery apparatus efficiency and thereby shortens pay-back time.

Smaller diameter tubing optimizes surface area. Maximum temperature differential is ensured by the previously discussed ducting. Metal tube material has the best thermal conductivity.

Wastewater, however, with its indeterminate particulate composition favors larger cross-sectional area tube. Large diameter tubing reduces total surface area available for heat transfer because less total linear footage of it can be fitted into a given space. More space is taken up by the hollow interior than is the case with smaller diameter tubing. But larger tubing allows higher rates of flow.

To provide maximum heat transfer and maximum flow under varied wastewater flow conditions found in a heavily occupied building, a large wastewater heat recovery apparatus can use the following novel heat exchanger arrangement.

It comprises a flat set of concentrically arranged and spaced, metal enhanced tubing tube rings. The concentric conduits are manifold at their entrance and exit ends. The entry end of each ring connects to a first manifold means supplying wastewater and a second manifold means collects the cooled wastewater emerging from the exit ends of the tube rings. The first manifold crosses radially over or under half of the concentric conduits. In crossing over the conduits, any flowing wastewater inertially continues along to the manifold's end and thereby to the entrance of the outer and longest tube ring with the largest surface area. Increasing wastewater flow beyond the capacity of that outer conduit's cross-sectional area causes the wastewater to back up in the manifold to the next inner tube ring doubling the flow capacity. Additional flow enters progressively more inwardly conduits until at full flow all the conduits are conducting wastewater.

This heat exchanger invention ensures maximum heat transfer efficiency at all wastewater flow rates. It optimizes the heat transfer parameters automatically without moving parts.

Maximum wastewater flow is manifolded to the combined conduit rings at their combined entrances where the largest cross-sectional and surface area is presented to the wastewater and the tank water. Lesser flow rates use the most efficient longer path outer conduits.

Stacking such heat exchangers is possible in very large installations. These stacked heat exchangers would be vertically spaced in layers with funnel-shaped separators inserted therebetween so their respective convective flows are directed inwards towards the central duct to rise in unison. The separators ensure cold tank water contact with all layers.

A one way check valve in-line with the wastewater feed pipe comprises two fittings connected by a larger diameter check valve tube. The first upstream fitting has a first end that connects to the wastewater feet tube and a second end containing a slit. A hingedly formed plastic flap has a first end held in the slit by normal clamping means used to connect the present check valve to the wastewater feed tube. It may also be adhesively attached to said slit. The operative second end of this flap is free to hingedly travel through an angle within the large diameter check valve tube. The flap closes over the end of the smaller inside hole in the first fitting in response to a flushing fluid flowing in reverse. Such a flow would come from a pressure blast of water allowed to enter the wastewater feet tube downstream from the check valve. With the check valve thereby forced closed over the wastewater feed, the full flushing water blast must enter the lower wastewater heat exchanger which it thereby flushed clean.

In conjunction with a standard vacuum-breaking check valve designed to prevent back flow, an electrically timed and operated valve to allow full pressure mains water into the wastewater pipe, downstream of the check valve, would provide automatic flushing at predetermined times to ensure free flow through the lower heat exchanger. Dribbles from the end of draining an appliance which may be left to dry out would be efficiently flushed out. Maintenance of the heat exchanger is then automatic.

A simpler method of operating the flush valve would be by a thermostatic switch (thermostat) attached to the tank. Should the wastewater flowing through the lower wastewater heat exchanger element begin to slow down or stop, the tank would have to become colder and colder since less and less heat is deposited therein while the ground cold water continues unimpeded flow taking out heat. The thermostatic switch would then operate the flush valve for few seconds in response to the fouling thereby clearing the obstruction. Alternatively, a float switch could be used since the volume decreases as the temperature decreases.

In another embodiment ancillary to the recovery of heat from wastewater, improvement of performance is addressed. It is well known that the heat given off as convective flow from a submerged surface can be described as a plume rising from the surface. Oppositely, cooling produces a descending plume. A heated plume rising from a tube surface actually forms an insulating layer that reduces the rate of heat transfer. This is because the plume from the lower half of the tube rises to enclose the upper half with warm, not cold water. Therefore if one studies a rising plume it is seen that much more heat is transferred from the lower half of the tube than from the upper half since the temperature differential across the lower half is higher.

I have found that this problem can be somewhat relieved by providing vibration to the plume to de-couple it from the tube and thereby increase the temperature differential at the top half. The vibration can be provided in numerous ways including ultrasonic vibration, tubing agitation and vibratory bases on which the wastewater heat recovery apparatus sits. Turning off the source of vibration when there is no wastewater flow through the wastewater heat recovery apparatus, becomes a new problem. This can be done by an invention comprising a light weight flap inserted in the flow path of the rising convection current. This flap normally just-sinks in the tank water. When convection does occurs due to warm wastewater flow, the rising convection stream raises the flap. A similar arrangement in the cold duct can be fitted. A light source and associated light detector across the path of flap motion, will provide non-intrusive means to switch on and off the vibration means. Energy consumption of the vibratory means is minimized and, as well, the normal and desired stratification in the tank is maintained by using the vibration only when required In installations where vertical room is limited a stand off or remote reservoir may be connected to the heat exchanger reservoir with fittings and tubes between the lower levels and between the upper levels of the reservoirs. Heat rising from the heat exchanger in the main reservoir would be able to travel horizontally to and from the remote reservoir thereby providing additional thermal storage capacity in the same vertical space. Likewise cooler water in the remote reservoir could travel back and forth through the lower connections.

Another installation possibility is to use available grinder-pump-in-a-tank units installed in an insulated hole in ground and wherein the wastewater flow is collected and then automatically pumped through the heat exchanger. This method is particularly suited to grade-built buildings with no basement, and, to installations where the only access to the wastewater stream is below grade or below a concrete floor.

BRIEF DESCRIPTION OF THE DRAWINGS

FIG. 4 is a partial sectional view of one embodiment of the wastewater heat recovery apparatus;

FIG. 5 is a cross section view of plain tubing with laminar layer;

FIG. 6 shows the same tubing with different protuberances of enhanced tubing intruding into the interior to create turbulence;

FIG. 7 shows a longitudinal cross section view of the plain tubing as in FIG. 5, also with the laminar layer and also with flow therethrough;

FIG. 8 shows the same view with protuberances of enhanced tubing as in FIG. 6 and the resulting turbulence where the laminar layer in passing fluid would be;

FIG. 11 is a top view of one embodiment of a wastewater heat exchanger showing the preferred method of treating wide range of wastewater flows;

FIG. 12 is a side elevation view of the same embodiment showing the cross over of the inlet or feed manifold and the outlet manifold;

FIG. 13 shows an end elevation view of FIG. 11 showing a single ring of tubing attached to the manifolds and the exchangers position low in the tank;

FIG. 14 is one embodiment of a separator for the wastewater stream with tapered holes allowing passage through the inner conduit's wall, of the liquid and small particle component of the wastewater and the surrounding collection jacket in partial section, with fitting to connect separated wastewater to the wastewater heat recovery apparatus;

FIG. 15 is a cross section view of the same embodiment across the holes showing the tapered hole arrangement, the deflector and the jacket;

FIG. 16 is a longitudinal section of the same embodiment showing the circumferential hole structure, the deflector and surrounding jacket, and the path wastewater and/or small particles take to pass through the tube wall;

FIG. 17 is a different embodiment of a separator where the deflector is integral with the stacked rings spaced and shaped to provide tapered, non-blocking opening for wastewater passage and showing the assembled rings held in alignment with vertical connectors;

FIG. 18 is a cross section view of the same embodiment;

FIGS. 24, 25 and 26 show one embodiment of fluted cold-duct work.

FIG. 28 is a side elevation view of a free convection wastewater heat exchanger showing a two-way duct and convective flows therethrough.

FIG. 29 is a top view down into a two-way duct showing the vertical insulative separator.

FIG. 30 illustrates a preferred embodiment of a two-way duct made from one piece of material.

FIG. 31 is a top view of the duct system showing funnel with duct at center.

FIG. 32 is a perspective view of the funnels and duct with the top funnel spaced from the duct.

FIG. 36 is another embodiment of a separator that uses a gap;

FIG. 37 is a variation of the embodiment of FIG. 36.

FIG. 38 is another embodiment of a separator suited to more horizontal drainpipes;

FIG. 39 is the same embodiment as FIG. 8 with a high flow from a flushed toilet;

FIG. 40 is an end view of FIGS. 38 and 39;

FIG. 41 shows another embodiment using a flexible fabric/mesh separator element.

DESCRIPTION OF PREFERRED EMBODIMENTS

In all drawings, drain pipe 100 carries wastewater to the sewer 104. Pipe 101 carries cold fresh water to hot water tank which supplies building with hot water via pipe 108.

Figure 1:
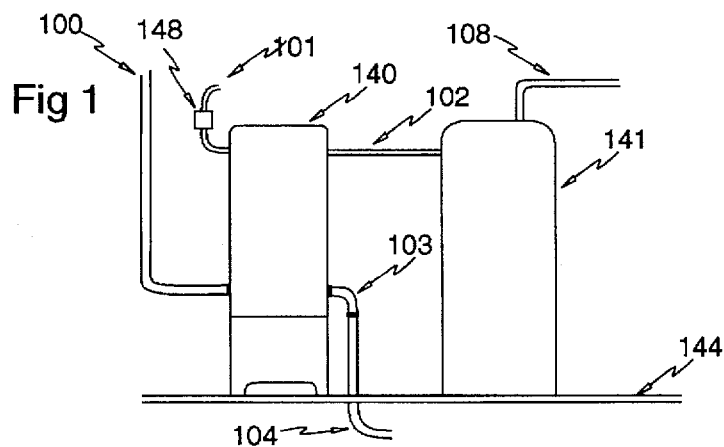
FIGS. 1, 2 and 3 schematically show an installation of a wastewater heat recovery apparatus and ancillary components in schematic installation.
Figure 2:
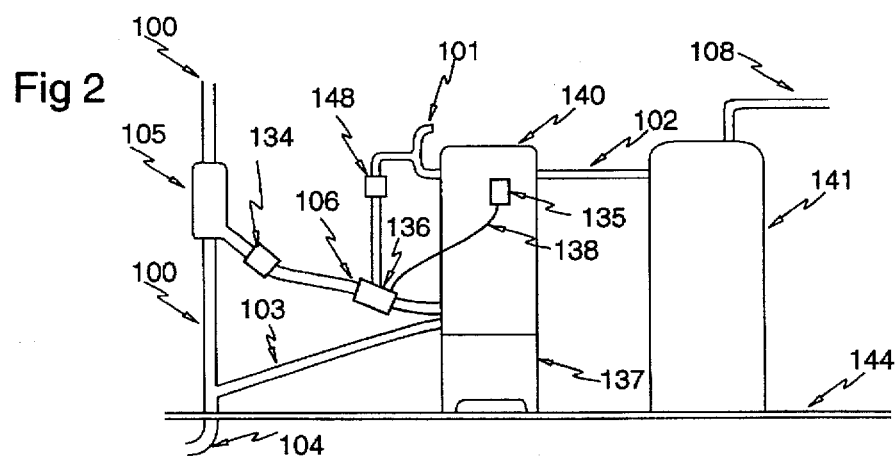

Different installations of the wastewater heat recovery apparatus 140 are shown in FIGS. 1, 2, 3, 27, 35 and 42. The simplest wastewater heat recovery apparatus installation, FIG. 1, is in a building such as a hotel or hospital where the volume of hot water use is great and the wastewater heat recovery apparatus has a wastewater heat exchanger of sufficient cross sectional area that all wastewater and the contained particulate matter including the toilet effluent can pass therethrough with no danger of blocking. In FIG. 2 is shown a more typical installation in a smaller building where it is impractical to re-plumb the building to have a separate drain for a toilet to thereby eliminate large particulate matter from entering the wastewater heat exchanger. Since the cost of a large cross section heat exchanger would be prohibitively expensive and small cross section tube within the wastewater heat recovery apparatus 140 would be blocked by large particulate matter, separator 105 replaces a section of the original drain pipe. This provides a non-blocking means of separating the large particulate, mainly from the toilet, from the liquid and smaller particulate matter such as food particles. This separated wastewater is conducted to the wastewater heat recovery apparatus via inlet pipe 106 while the larger unwanted waste continues to the sewer 104. The wastewater from the wastewater heat recovery apparatus recombines with the large waste via outlet pipe 103, and continues to the sewer 104.

Figure 3:
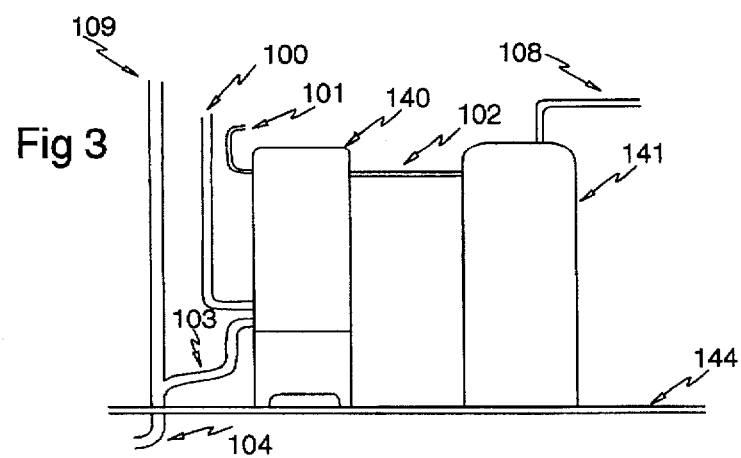

In new small buildings, FIG. 3 shows another installation arrangement where a toilet is separately plumbed to the sewer via toilet drain pipe 109 and the wastewater heat recovery apparatus is fed only the wastewater from all other sources via drain pipe 100.

Figure 42:
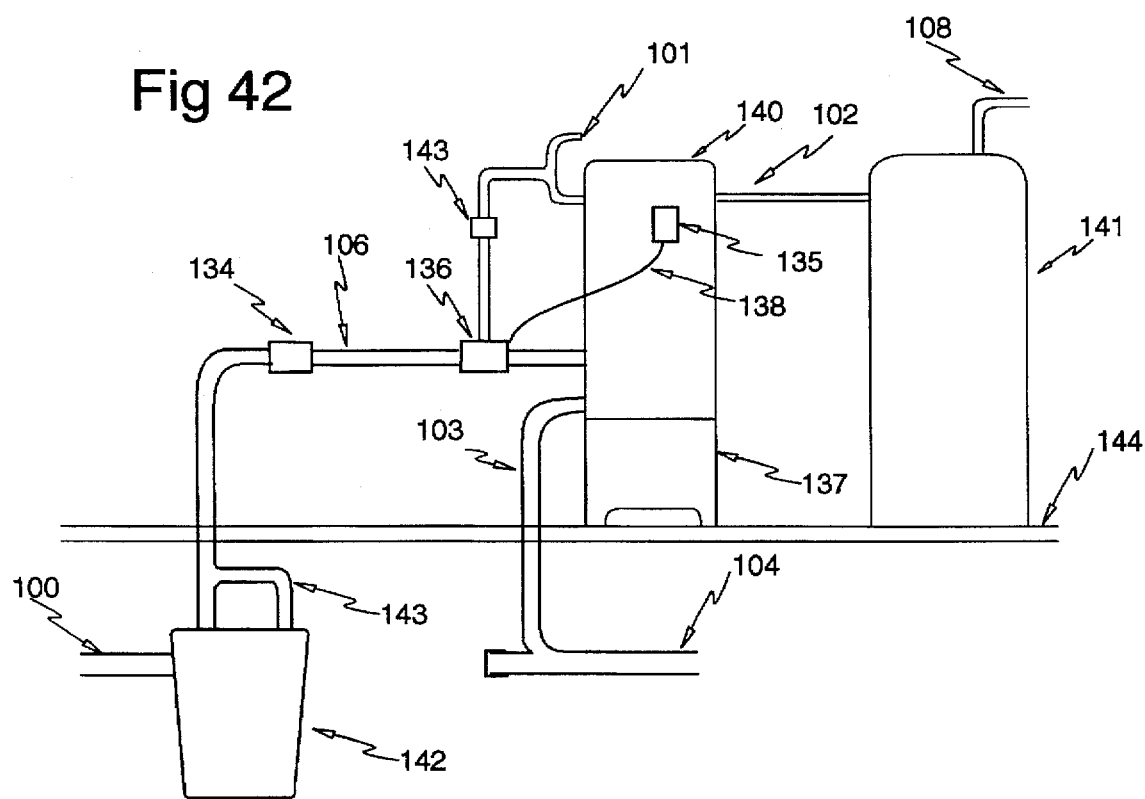
FIG. 42 shows an installation of the wastewater heat recovery system where the drain pipe is located below grade or under a floor.

In FIG. 42 is shown an installation where the drain pipe is below the floor 144. A tub and pump 142, such as a commercially available wastewater grinder pump, is installed to receive the wastewater from drain pipe 100. When sufficiently full the tub pump 142 pumps the wastewater through the non-blocking check valve 134 and past the electric flush valve fitting 136 into the heat exchanger at the bottom of the apparatus 140. Wastewater leaves through drain pipe 103 to the sewer via sewer pipe 104. In this FIG. 42 is also shown the thermostatic switch 135 which controls solenoid flush valve 136 in response to lower than normal temperatures. Standard fresh water check valve 148 provides isolation of the apparatus from the mains water supply to prevent any possible back draining.

In another embodiment shown in FIG. 36 the wastewater heat recovery apparatus 140 is connected to a remote reservoir 150 which is filled with clean water. This provides greater thermal storage capacity where vertical limitations exist. The remote reservoir 150 connects to the apparatus 140 with bulkhead fittings 152 and flexible tubing 151 and 152.

The wastewater heat recovery apparatus 140 pre-heats fresh water with the upper heat exchanger fed cold fresh water via pipe 101. The pre-heated fresh cold water continues to the hot water tank via pipe 102.

The wastewater heat recovery apparatus 140 is shown in partial section in FIG. 4 where tank 1 contains a wastewater heat exchanger 4 located bottomwardly in the tank and a fresh water heat exchanger 3 located topwards in tank. Tank is filled with heat transfer fluid 2, (water), to touch or submerge 3. Heat exchangers 3 and 4 cause opposite moving convective currents, up convection currents from 8a which are rising from being heated, and, down convective currents from 8b which are sinking from being cooled. Duct 5 separates the currents preventing loss of temperature by their intermixing. The fresh water supply connections 9 and 10 and wastewater connections 6 and 7 complete the basic invention and constitute one embodiment of the wastewater heat recovery apparatus. Wastewater flowing through the lower heat exchanger gives off heat to the water which becomes less dense and rises by convection to an upper level. Cold, fresh water passing through the upper exchanger is heated and thereby cools the tank water which causes descending convection currents that sink to a lower level.

Figure 23:
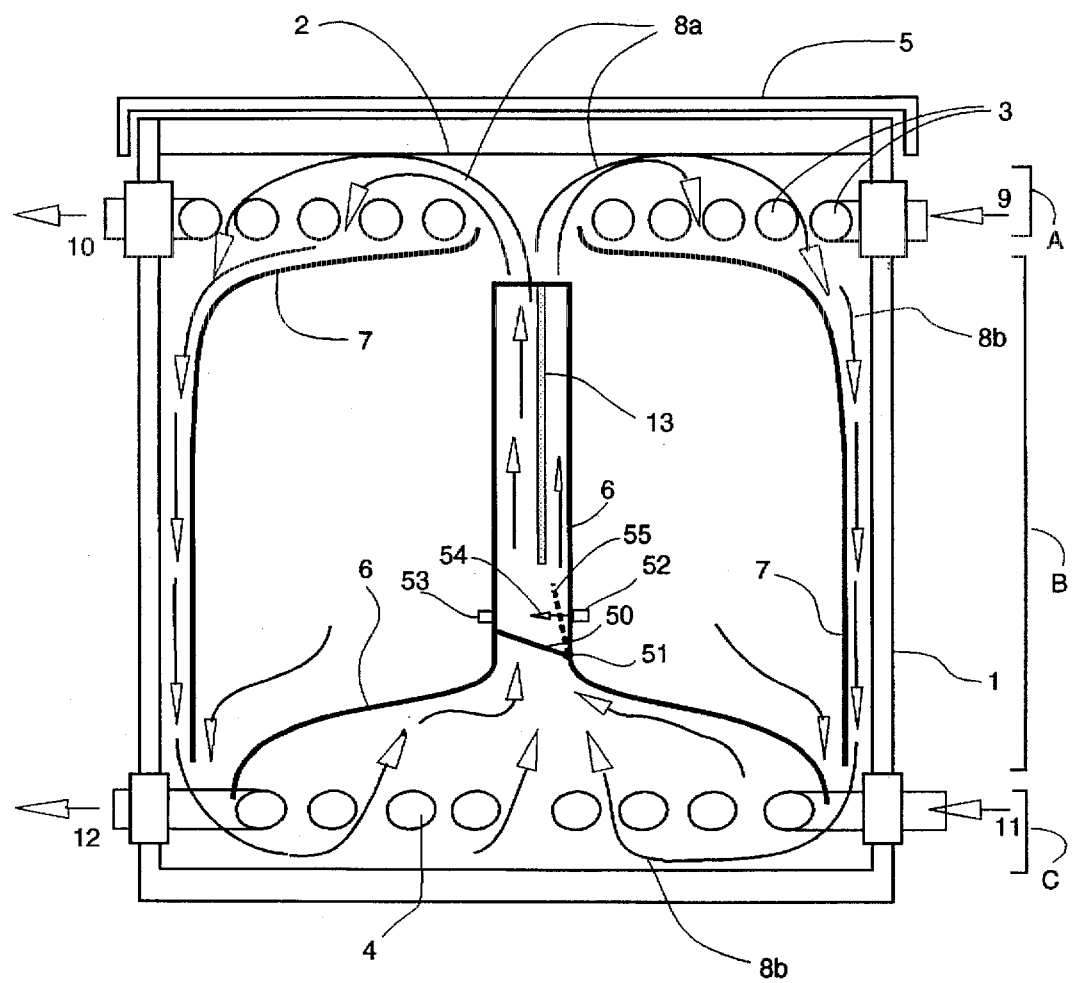
FIG. 23 is a schematic representation of the wastewater heat recovery apparatus showing the convective flow paths, the flow directing ductwork, and the flap to detect upwards flow with the associated light switch to operate the vibratory means.

In FIG. 23 the tank full of clean water B provides thermal storage for recovered heat, the hottest top layer A optimizes heat transfer into fresh water heat exchanger 3, and the coldest water C at the bottom optimizes heat transfer out of wastewater heat exchanger 4.

In FIG. 28 is shown the components of the preferred duct work with the Top Funnel 201 beneath Cold Water Element 3 and Inverted Bottom Funnel 205 above Wastewater Element 4 and Two-Way Duct 204. Cold Convection Currents 8b are shown entering Two-Way Duct 204 at the top and emerging beneath Wastewater Element 4. Conversely Hot Convection Currents 8a are shown entering Duct 204 and emerging above upper heat exchanger 3. Separator 208 divides duct 204 as indicated. Perforations 13 allow for a condition where convecting currents may leave the duct at the tank-strata (layer) appropriate for their temperature, rather than remain and fill the duct 204 and thereby reduce heat transfer from the respective heat exchanger. This could occur if an appliance discharging a hot wastewater such as a dishwasher is followed by a low temperature discharge such as a hand sink. The hot wastewater would create a hot layer of fluid at the top of the tank preventing less hot convection currents from rising through that layer.

In FIG. 29 is shown the Two-Way Duct 204 from above with the Down Side 202 and the Up Side 220 and Separator 208. The material would be notched at the top and bottom prior to folding, to provide the entrances for the respective currents.

In FIG. 30 is shown the preferred embodiment of the two-way Duct 4 that may be made in one piece from an insulative materials folded as shown and including a full length Slit 13.

As can be seen in FIGS. 28 and 31, Duct 204 can be made from two identical half tubes connected vertically off-axis along their flat sides.

FIG. 32 is a perspective view showing the top funnel 201 spaced from the duct 204 with the arrow indicating assembly direction. The duct's construction is evident and the top funnel 201 will connect to the duct where the duct is full and round indicated at 211.

The problem of fouling of passageways is solved by causing turbulence in the passing wastewater through the use of enhanced tubing. FIGS. 5 and 7 show how a typical pipe or tube with a fluid passing therethrough forms a well known, slow moving laminar flow With boundary layer 16 next to the inner wall 12 which is where precipitation of particulate matter occurs onto the inner tube wall leading to poor heat transfer to the wall and eventually to choking of the tube as the precipitant grows thicker over time. To cause turbulence 15 shown in FIG. 8, protuberances to inner wall 12 shown in FIG. 6 can have a pebble-like shape shown by 13, which are a product of their respective dimples shown by 14 to outer wall 11. FIG. 8 shows the results of fluid flowing over the enhanced tubing which produces vortexes of turbulence 15 destroying laminar flow and boundary layer thereby maintaining particulate matter in suspension. By being able to densely dimple tube with the impact process of enhanced tubing, the entire tube provides a continuous turbulence and a non-fouling interior, much like a stream bottom where matter carried in the water is continually washed away (turbulent flow) from the stream bottom but which settles where water flow slows (laminar flow) in a pool or near the stream's edge.

Figure 9:
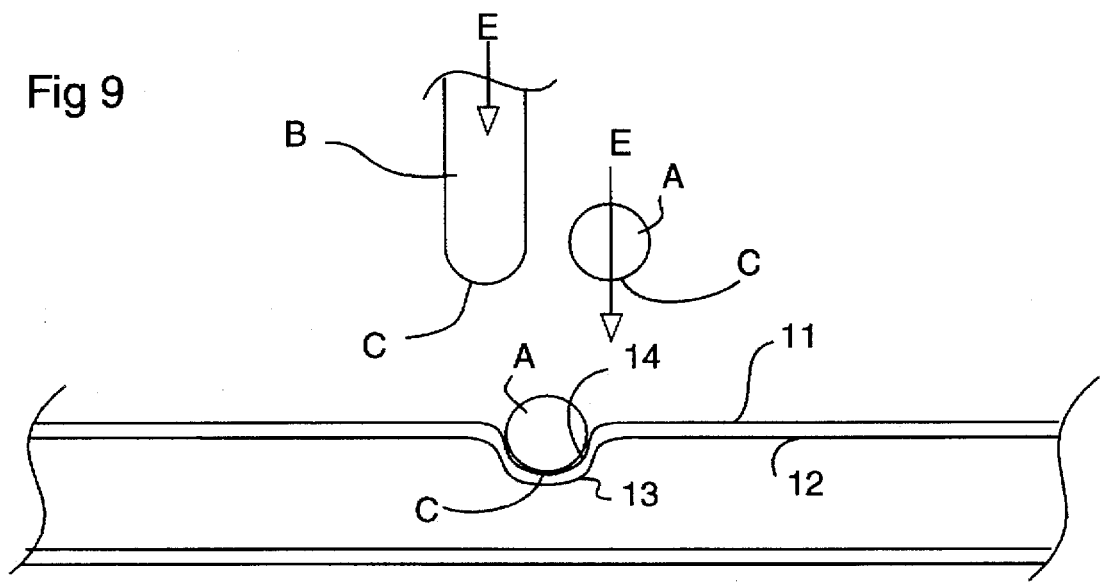
FIG. 9 shows how the enhanced tubing protuberances are made.
Figure 10:
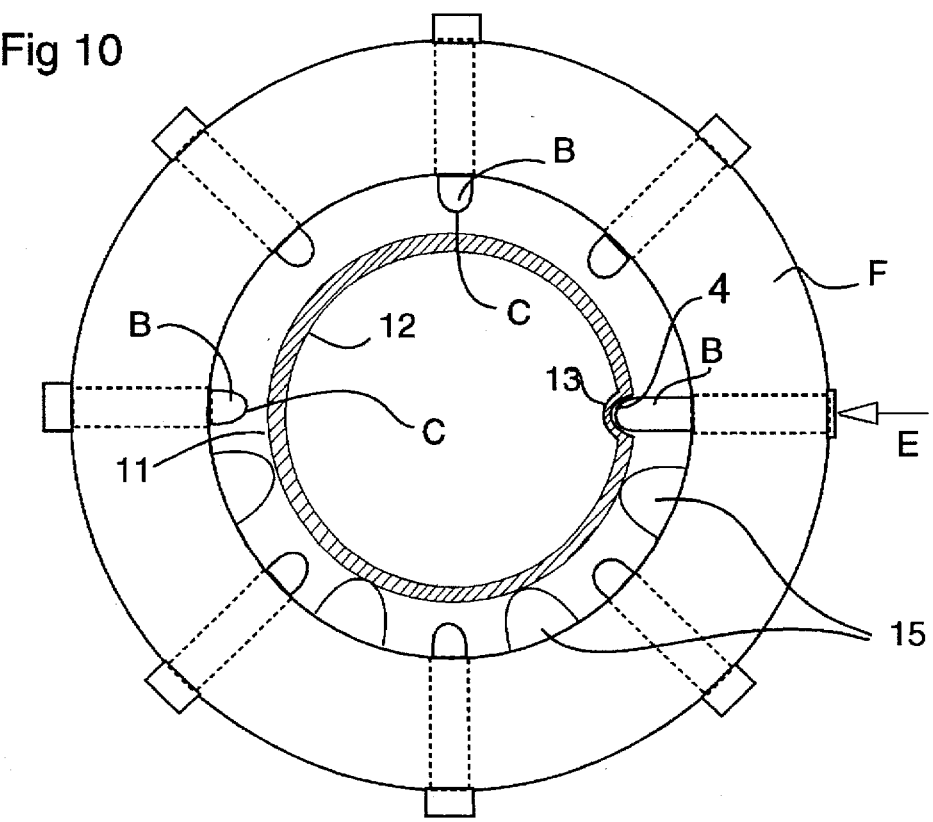
FIG. 10 is a cross section of plain tubing passing through a tool holder with several impacting tools poised to impact and one doing so.

Producing enhanced tubing is shown in FIGS. 9 and 10 where outer tube wall 11 is impacted by a punch B or projectile A whose contact surface C impacts the wall due to high velocity force E producing a highly localized dimple 14 and a respective protuberance 13 to the inner wall 12 of the tube. In FIG. 10 is shown an embodiment of a tool for mass production of enhanced tubing. The tool body F has arranged circumferentially about it, a set of punches B which can be operated by high speed means E to impact the tube outer wall 11. The tube to be processed into enhanced tubing passes therethrough guided by guides 15. The order, pattern and frequency of punching can be controlled by computer at very high speed much like a dot matrix printer head imprinting paper.

In FIG. 11 is shown a top view of a planar heat exchanger suitable for use with wastewater. The construction is metal with copper, aluminum or stainless steel being suitable. Finned tubing may be used. The rings 20 through 20f are all of the same shape as shown in FIG. 13 where only ring 20 is shown to provide clarity. The rings are spaced with flow clearance 26 between each ring. The rings are concentrically arranged. An inlet manifold 21 supplies all the rings inlet ends such as entrance end 27 for ring 20. The inlet manifold passes over or under as shown in FIG. 12 which is a side elevation view.

By this small but important arrangement, all wastewater will automatically flow by inertia to the end of 21 where the entry to the longest ring (20) is, thereby providing the longest and most effective initial path for heat transfer into the tank water. If wastewater flow increases beyond the flow capacity of this first ring, it will back up in the inlet manifold to reach the next ring 20a and increasingly to more inner rings 20b, 20c, 20d and so on until full wastewater flow passes through all rings. This occurs only during brief periods of high water use in the building such as morning time. During most other times of the day and night only the outer rings are passing wastewater under lesser flows thereby providing optimum heat transfer while the presence of the inner rings ensure adequate flow for heavy use periods.

Also shown in FIGS. 11, 12 and 13 is outlet manifold 22 which receives the wastewater after its passage through any and/or all of the rings and conducts it to the final drain or sewer connection for removal from the building. The rings above described are made from enhanced tubing described earlier and in the FIGS. 11, 12 and 13 the enhanced tubing dimples 24 are show as localized groupings although they in fact cover the entire assembly of rings and preferably the inlet and outlet manifolds as well. Another embodiment of this heat exchanger can be constructed by stacking the single assemblies described and providing means to split the wastewater supply into each. In this way the overall efficiency of the wastewater heat recovery apparatus can be increased since one principle of heat transfer is surface area exposed to the two fluids involved. By stacking the elements the total surface area can be doubled, tripled etc., providing a more expensive but more efficient wastewater heat recovery apparatus. Also shown in FIGS. 11 and 12 is an auxiliary flush fitting 23 through which a full pressure blast of cold water could periodically be sent through to create maximum turbulence in the rings for their cleaning and for unblocking from misuse. Crushed ice added to the flush would scour the interior of the tubes clean without risk of blocking as the ice would melt to liquid.

Figure 33:
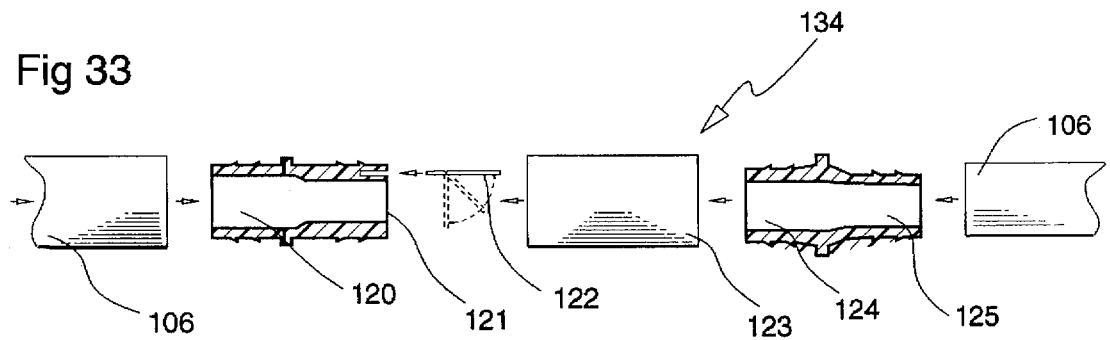
FIG. 33 shows a check valve in exploded view.
Figure 34:
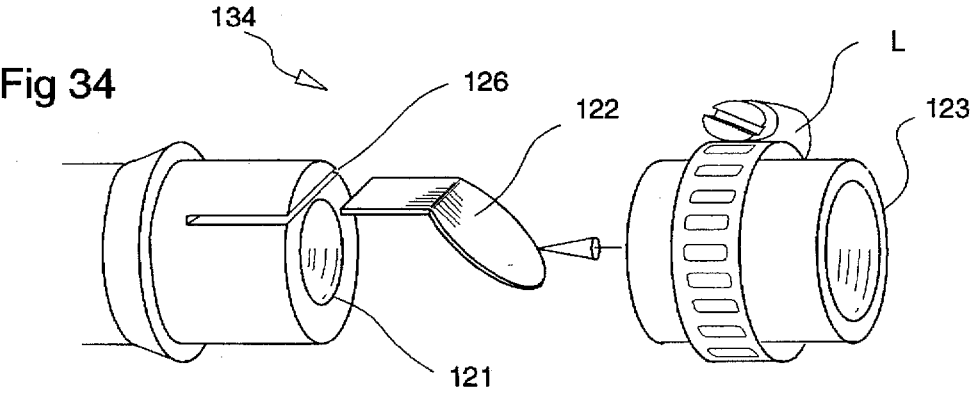
FIG. 34 shows the operative components of the check valve.
Figure 35:
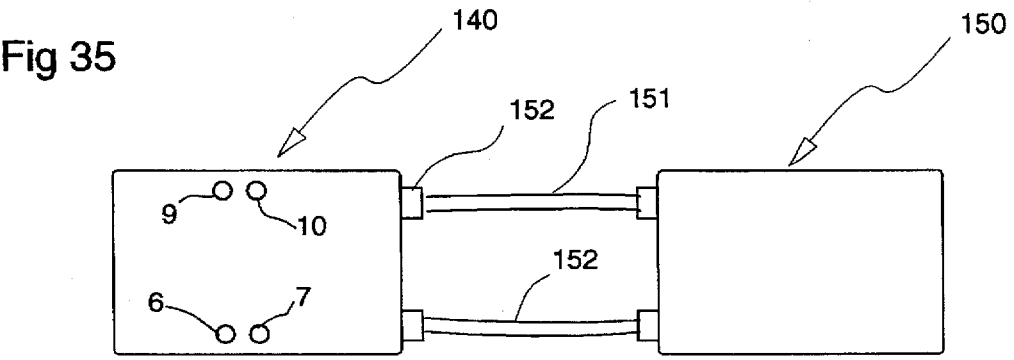
FIG. 35 shows a remote reservoir assembly.

In FIGS. 33 and 34 are shown one way check valve 134. It plumbs in-line with the wastewater feed pipe. Check valve 134 comprises two fittings 120 and 124 connected between wastewater feed pipe 106 and wastewater heat recovery apparatus 140. Fittings 120 and 124 are connected between a larger inside diameter check valve tube 123. The first upstream fitting 120 has a first end that connects to the wastewater feet tube 106 and a second end containing a slit 126. A hingedly formed plastic flap 122 has a first end held in the slit 126 by normal clamping means used to connect the present check valve to the wastewater feed tube. The operative second end of this flap is free to hingedly travel through a 90° angle within the large diameter check valve tube 123. The flap closes over the end of the smaller inside hole 121 in the first fitting 120, in response to a flushing fluid flowing in reverse. Such a flow would come from a pressure blast of water allowed to enter the wastewater feet tube downstream from the check valve. With the check valve thereby forced closed over the wastewater feed, the full flushing water blast must enter the lower wastewater heat exchanger which it thereby clears.

In conjunction with a standard vacuum-breaking check valve 148 in FIG. 42 to prevent back flow, a timed electrical solenoid valve 136 allows full pressure mains water from pipe 101 to enter the wastewater downstream of the check valve 134. This would provide automatic flushing at predetermined times to ensure free flow through the lower heat exchanger. Dribbles from the end of draining an appliance which may be left to dry out would be efficiently flushed out. Maintenance of the heat exchanger is then automatic.

Another way of accomplishing flush valve 136 operation is with a thermostat 135 shown in FIG. 42, Connected by wire 138 to flush valve 136, the thermostat would turn 'on' (for a short time only, and, only once per, say, 12 hour period) in response to a lower than normal temperature in apparatus 140. This would happen whenever slow or no flow in the wastewater heat exchanger would allow all the heat in the apparatus to be absorbed by fresh water in the upper heat exchanger. The thermostat 135 is attached to the outside wall of apparatus 140. This flush action need only last for a few seconds so a timing device would control the flush period. This is particularly useful where water is scarce. It may well be that no flushing is required if the wastewater flows well enough not to sludge-up the heat exchanger.

FIGS. 14 to 18 are of a separator for use in smaller buildings such as family residences where it is necessary to avoid the toilet matter from entering the wastewater heat recovery apparatus which would cause blockages in smaller diameter tubing needed to provide cost effectiveness for the smaller wastewater heat recovery apparatus owner.

The separator shown as 105 in FIG. 2 is inserted in the vertical section of the normal drain pipe from which a suitable section has been removed. The wastewater supply including that from the toilet(s) enter the separator at entrance 30 which in the embodiment shown in FIG. 14 is a continuous section of pipe that has a central perforated section 38 with tapered holes 34 and exit at outlet 37 which connects to the remaining original drain pipe that leads to the sewer as shown by 107 in FIG. 2.

The perforated section is contained within a sealed jacket 31 which has a connection end 32 that connects to the wastewater heat recovery apparatus as shown by 106 in FIG. 2. The perforated section is comprised of tapered holes 34 which are shown in cross section in FIG. 15. Tapering the holes ensures that particulate matter cannot pack into the hole blocking same. Wastewater carrying the small particulate matter that passes through these perforations are deflected away from the lower rings of holes as separated wastewater 36 by deflector rings 33 which ensure that 36 will not simply flow back down the outside of the perforated section and re-enter at a lower place. The separated waste stream accumulates in the jacket and passes through connection end 32 to the wastewater heat recovery apparatus for heat removal after which it continues to the sewer by re-joining with the larger solids that passed straight through the separator and exited at outlet 37 leading to the sewer as shown by 103 in FIG. 2. There are other ways of constructing separators for wastewater including the embodiment shown in FIGS. 17 and 18 where the tapered perforations are as slots formed by the stacking of discs 38 shaped to provide the required features of solids separation and deflection of same into jacket The stacked discs are held in alignment by rods 37 which are bonded, welded or molded to the discs.

A second embodiment is shown in FIGS. 18 and 18 where the tapered apertures are formed at the beveled ends of a stacked set of Spaced Beveled Discs 38. Each beveled disc includes a molded-in deflector. The stacked discs are held apart to create tapered apertures or tapered slits therebetween, and, to maintain alignment, by Spacers 37 which are bonded, welded or molded to the discs.

A third embodiment is shown in FIG. 41. It comprises an Entry Section 30 connected to an Exit Section 37 by a Flexible Mesh Section 30c. This flexible mesh responds to the turbulent flow of wastewater by flexing which will dislodge blockages in the mesh. Additionally, since the wastewater solids are substantially organic, any blockage of the mesh openings will decompose in time and eventually be dislodged by this and by the repeated flexure thereof. On the left side of 30c in FIG. 41 is shown a plain tubular form of the mesh while on the right side is shown a variation where Pleats 33 are formed in the mesh to form integral deflectors.

In the above embodiments, additional benefits could result from supplying the waste water to the aperture-containing first conduit section in a tangential manner to cause a swirling fall of liquid therethrough. Alternatively, in FIGS. 15 and 16, Vanes 33b may be angularly disposed in the Entry Section 30 to the above described separators to induce a desirable swirl to the downward flow. The swirl would expose all apertures to the wastewater flow improving separation, especially in cases of limited vertical space and overall diameter limitations.

A forth embodiment shown in FIGS. 36 and 37 uses an Area of Capillary Action 46 for liquid to freely flow angularly from First Conduit Section 30 to Second Conduit Section 37. This area 46 also allows larger Solid Component A to fall by gravity out of the wastewater through Gap 30d into enlarged entry to Third Conduit Section 37 whereafter these solids continue directly to the sewer. The Angle 46 determines the size of the solids separation and overall length of the separator. Toilet flush, being of high volume in a short time (high flow rate), will have sufficient momentum to pour through the gap ensuring secure operation of the building's wastewater drainage system. In this embodiment the non-blocking aperture is the Gap 30d. The exit section has provision such as a funnel end in FIG. 36 which requires a Ring 43 to allow assembly. Another such provision is shown in FIG. 37 where the enlarged end of Third Conduit Section 37 ensure solids drop into it. These embodiments can be made from molded plastic plumbing-style fittings assembled into the desired structure.

A fifth embodiment is shown in FIGS. 38 and 39 where wastewater flow in substantially horizontal. In FIG. 38 is depicted normal wastewater flow from showers, washers, etc., while FIG. 39 depicts a toilet's high rate of flow. A First Conduit Section 30b between Entry 30 and Exit 37 provides a vertical step in the wastewater flow. At this step are Outwardly Tapered Apertures 34 over which the wastewater flows. Liquids and small particles escape into Jacket 31 that leads to Fitting 32 for connection to a wastewater appliance such as a heat exchanger. It can be seen in FIG. 39 that the special case of toilet flow is dealt with by the step which causes the high flow rate to have a trajectory over the step landing in Exit Section 37. FIG. 40 is an end view of this embodiment showing the narrow end of the slits that are the Outwardly Tapered Apertures 34. This aperture-containing portion may be a separate piece comprising 31, 32 and 34, inserted into an opening in the step section.

In the above described separators, wastewater flow from the standard flush toilet, a sudden huge flow, would tend to pass through the center of the separator, liquid and solids, ensuring adequate carrying of these septic wastes to the sewer. thereby preventing toilet solid buildup further downstream in the drain pipe.

Figure 19:
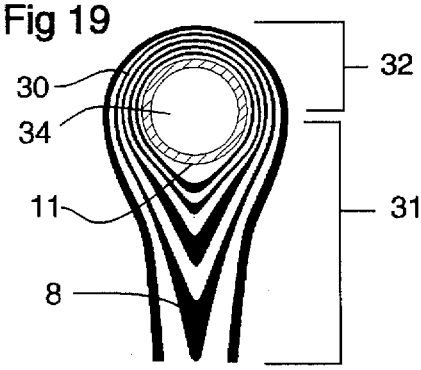
FIG. 19 is a plume of laminar flow from a cooling tube in cross section.
Figure 20:
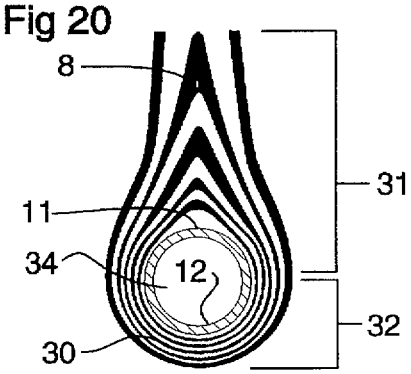
FIG. 20 is a plume of laminar flow rising from a heated tube in cross section.
Figure 21:
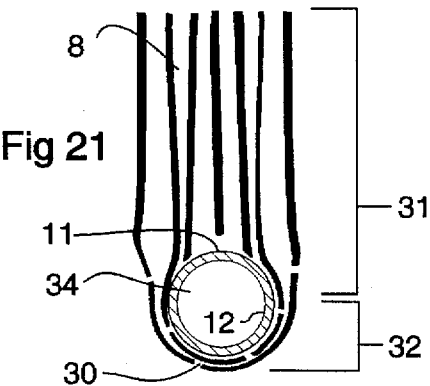
FIG. 21 shows the same plume where the influence of a vibration has reduced the thickness of the laminar flow over the tube improving heat transfer.
Figure 22:
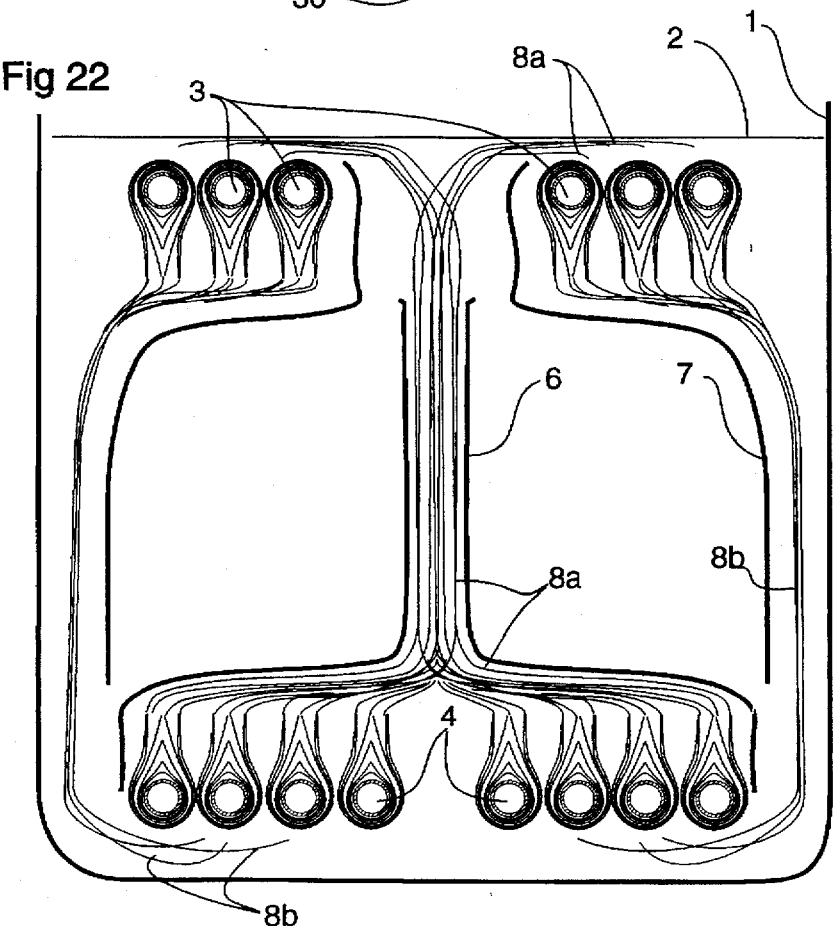
FIG. 22 is a schematic of the wastewater heat recovery apparatus with the rising and descending plumes, the directive ductwork and flow paths within the tank.

FIGS. 19, 20, 21, and 22 are all concerned with plumes that form from a heated surface in a fluid such as the tank water in the wastewater heat recovery apparatus. FIG. 19 shows a sinking plume 8 from a cooled surface such as the upper heat exchanger 3 in the wastewater heat recovery apparatus. FIG. 20 shows a rising plume caused by heating such as the lower heat exchanger 4 in the wastewater heat recovery apparatus. Referring only to FIG. 20 the plume has two main sections: a lower half 32 and an upper half 31. The subject of plumes and the heat transfer associated with same is explained in the text book *Principles of Heat Transfer by Frank Kreith*, and published by International Textbook Company of Pennsylvania, U.S.A. Referring to FIG. 20, the lower half 32 has a relatively thin temperature gradient 30 which is desirable for heat transfer from fluid 34 passing through pipe 35. The upper half 31 has a much thicker temperature gradient insulating the pipe preventing the surrounding tank water from directly contacting the pipe's surface. In FIG. 22 a schematic of the wastewater heat recovery apparatus shows how it works by the plumes that develop, collect as convection currents that transport the recovered heat from the bottom to the top and sends cooled water to the bottom from the top. FIG. 21 shows how the plume is affected by some vibratory means as previously explained. Here the plume is de-coupled from the pipe allowing improved heat transfer from the fluid in the pipe to the surrounding tank water. FIG. 21 shows the plume's temperature gradient reduced when vibration such as ultrasonics are employed within the wastewater heat recovery apparatus.

FIG. 23 shows a schematic of the wastewater heat recovery apparatus with A the upper heat transfer zone with the hottest layer or strata of tank water, B the middle thermal storage layers cooler than A, and C the lower heat transfer zone with the coldest layer or strata of tank water. Thus the upper heat exchanger through which passes only cold water to be preheated is submerged in A while the wastewater to be cooled passes through heat exchanger 4 in zone C.

Cold layer C also represents the total extent of cooling of the tank water that would occur with cold wastewater. All upwards convection would cease leaving the recovered heat floating above.

Vent 13 allows for rising convection currents to leak out of duct 6 should a batch of hot wastewater produce a hot upper layer from, say, a draining dishwasher at 140° F., which a less hot next batch from, say, a draining sink, would be not be able to push upwards through and would therefore back-up in the duct 6 impairing the wastewater heat recovery apparatus efficiency. In FIG. 23 is also shown Flap 50 in resting position in raised position 55 when raised by rising convection currents in 6. The flap is attached hingedly at pivot 51. Light source 52 send a beam of light 54 across the flap's path to light receptor And switch 53 which keeps a vibratory means shut off until and unless flap is raised whereby the light beam is obscured and switch 53 turns on vibratory means. In FIG. 24 the cold convection current ducts are shown where the sinking currents are caused to flow down defined straight paths formed of flutes 40 in the duct material. Without these flutes or other means to direct and straighten flow, the currents can be seen to meander (using dye in a transparent model) which is unwanted since heat loss, accompanied by temperature reduction, will occur on any longer flow path. FIG. 25 shows a top schematic of the concerned wastewater heat recovery apparatus elements where fresh water heat exchanger 3 sits above cold current duct 7 with flutes 40 and cold convection currents 8b sinking down the flutes. The wastewater heat recovery apparatus tank is represented by 1. FIG. 26 also schematic, shows section view indicated in FIG. 24 and clearly shows one embodiment of how flow direction flutes may be fabricated by folding the duct material.

Figure 27:
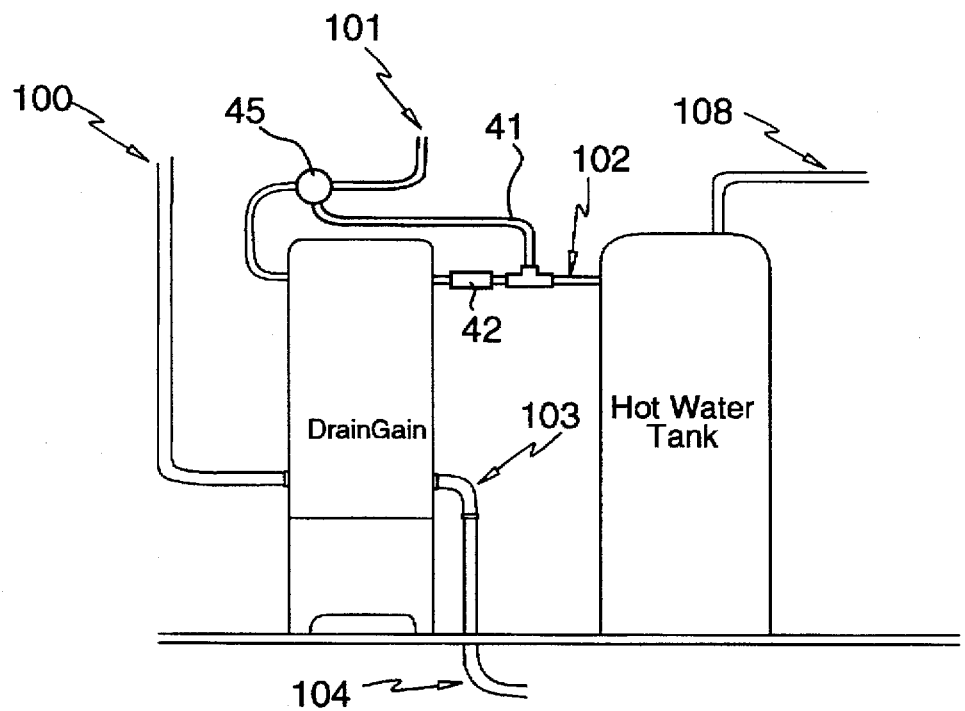
FIG. 27 is a schematic layout with safety valves installed in the plumbing system to by-pass the wastewater heat recovery apparatus in the event of a failure.

In FIG. 27 a by-pass valve 45 and associated by-pass pipe 41 is shown whereby the fresh water supply normally entering the wastewater heat recovery apparatus is re-routed. The valve is pressure sensitive and any failure in the steady-state water supply pressure would immediately actuate the valve thereby by-passing the wastewater heat recovery apparatus. An indicator means such as a raised red 'flag' or audible signal, would allow quick verification of the by-pass state. The same valve could be electrically actuated to by-pass the wastewater heat recovery apparatus in response to change in tank volume caused by a leak in wastewater and/or fresh water heat exchangers. One way valve 42 prevents by-passed flow from entering the wastewater heat recovery apparatus.

Although several embodiments of the present invention have been shown and described, it will be apparent that other adaptations and modifications can be made without departing from the true spirit and scope of the invention.

I claim:

1. In a plumbing system for a building, the plumbing system including a cold water supply and a water disposal conduit, the improvement comprising an apparatus to transfer heat from waste water in said water disposal conduit to said cold water, said apparatus comprising a reservoir, a heat transfer fluid substantially filling said reservoir, a first heat exchange means disposed bottomwards in said reservoir, said first heat exchange means having an inlet and an outlet, said inlet and said outlet of said first heat exchange means being operatively connected to said waste water disposal conduit such that water passing through said waste water disposal conduit will pass through said first heat exchange means, a second heat exchange means disposed topwards in said reservoir and spaced from said first heat exchange means, said second heat exchange means being immersed in said heat transfer fluid, said second heat exchange means having an inlet and an outlet operatively connected to said cold water supply such that cold water entering said system passes through said second heat exchange means, the arrangement being such that heat is transferred from said first heat exchange means to said second heat exchange means by means of said heat transfer fluid.

2. The improvement of claim 1 further including means in said reservoir to separate upward convection currents caused by said fluid being heated by said first heat exchange means from downward convection currents caused by cold water passing through said second heat exchange means.

3. The improvement of claim 2 wherein said plumbing system includes means for heating said cold water, said apparatus being connected such that cold water passes through said second heat exchange means prior to entering said means for heating said cold water.

4. The improvement of claim 2 wherein said means for separating upward convention currents from downward convection currents comprises at least one member arranged over said first heat exchange means to collect heat transfer fluid and direct said heated heat transfer fluid in a relatively narrow duct upwardly to an upper portion of said reservoir.

5. The improvement of claim 2 wherein said second heat exchange means is connected to a water disposal conduit from a heat generating appliance.

6. The improvement of claim 2 wherein said building is a residential house.

7. The improvement of claim 2 wherein said first heat exchange means and said second heat exchange means occupy between 5–20% of the total volume of the reservoir.

8. The improvement of claim 1 wherein said first heat exchange means comprises a plurality of concentrically arranged tubes having an inlet and an outlet, a manifold at said inlet connected to said waste water disposal conduit, said manifold being adapted to direct water initially to the outer most tube of said concentrically arranged tubes and sequentially to the inner tubes as the full capacity of the outer most tubes is used.

9. The improvement of claim 2 wherein said first heat exchange means comprises at least first and second layers of spirally arranged tubes.

10. The improvement of claim 2 wherein said second heat exchange means comprises at least first and second layers of spirally arranged tubes.

11. The improvement of claim 3 further including a member to collect cooled heat transfer fluid adjacent said heat exchange means and direct said cooled heat exchange fluid downwardly in a relatively narrow duct.

12. The improvement of claim 2 wherein said means to separate convection currents comprises an inverted funnel like member to direct said heated transfer fluid upwardly and a second member having a generally bell shaped configuration to direct said transfer fluid flow downwardly about the periphery of the reservoir.

13. The improvement of claim 1 further including means to disturb the boundary layer of liquid about at least one of said first and second heat exchange means.

14. The improvement of claim 1 wherein at least one of said first and second heat exchange means comprise at least one tube having a plurality of inwardly directed dimples to thereby create turbulence in liquid flowing therethrough, said dimples being spaced sufficiently close together to provide continuous turbulence in said liquid passing therethrough.

15. The improvement of claim 2 further including level detecting means in said reservoir to detect changes in the level of said heat transfer fluid therein.

16. The improvement of claim 2 further including a plurality of said apparatuses connected in a plumbing system, said apparatuses being connected in parallel.

17. The improvement of claim 1 further including separator means to separate liquid entering said first heat exchange means from particulate matter contained therein, said separator comprising a first conduit having perforations through which waste water passes, said perforations increasing in cross sectional area from the interior to the exterior of said conduit, a second conduit enclosing said first conduit, said second conduit having means to collect water flowing through said perforations and to direct said fluid to said first heat exchanger means while matter remaining in said first conduit is connected to a drain.

18. A method of recovering heat from waste water in a plumbing system in a building, said method comprising the steps of supplying a heat exchange apparatus comprising a reservoir, a heat transfer fluid substantially filling said reservoir, a first heat exchange means disposed bottomwards in said reservoir and spaced from the bottom thereof, a second heat exchange means disposed topwards in said reservoir and spaced from said first heat exchange means, said second heat exchange means being immersed in said heat transfer fluid, causing waste water from said plumbing system to pass through said heat exchange means prior to exiting to a drain, and directing cold water through said second heat exchange means whereby heat is transferred from said first heat exchange to said second heat exchange means by means of said heat transfer fluid.

19. The method of claim 18 wherein said cold water is directed through said second heat exchange means prior to entering a hot water heating apparatus.

20. A heat exchange apparatus comprising a reservoir, a heat transfer fluid substantially filling said reservoir, a first heat exchange means disposed bottomwards in said reservoir, said first heat exchange means having an inlet and an outlet, said inlet and said outlet of said first heat exchange means being operatively connected to a conduit from which heat is to be extracted, a second heat exchange means disposed topwards in said reservoir and spaced from said first heat exchange means, said second heat exchange means being immersed in said heat transfer fluid, said second heat exchange means being immersed in said heat transfer fluid, said second heat exchange means having an inlet and an outlet operatively connected to a liquid to be heated, means in said reservoir to separate upward convection currents caused by said fluid being heated by said first heat exchange means from downward convection currents caused by a colder liquid passing through said second heat exchange means, the arrangement being such that heat is transferred from said first heat exchange means to said second heat exchange means by means of said heat transfer fluid.

* * * * *